US012056207B1

(12) United States Patent
Chen et al.

(10) Patent No.: US 12,056,207 B1
(45) Date of Patent: Aug. 6, 2024

(54) TOPOLOGICAL ORDER DETERMINATION USING MACHINE LEARNING

(71) Applicant: SAS Institute Inc., Cary, NC (US)

(72) Inventors: Xilong Chen, Chapel Hill, NC (US); Tao Huang, Chapel Hill, NC (US); Jan Chvosta, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 18/538,070

(22) Filed: Dec. 13, 2023

Related U.S. Application Data

(60) Provisional application No. 63/529,849, filed on Jul. 31, 2023.

(51) Int. Cl.
*G06F 17/18* (2006.01)
(52) U.S. Cl.
CPC ................... *G06F 17/18* (2013.01)
(58) Field of Classification Search
CPC ........................................................ G06F 17/18
USPC .......................................................... 702/181
See application file for complete search history.

(56) References Cited

U.S. PATENT DOCUMENTS

| 7,475,048 B2 * | 1/2009 | Weston ............... G06F 18/2113 706/14 |
| 11,443,198 B1 | 9/2022 | Chen et al. |
| 2022/0108334 A1 | 4/2022 | Chauhan |
| 2023/0138016 A1 | 5/2023 | Kaiser |

OTHER PUBLICATIONS

Yi Wang, Yi Li, Hongbao Cao, Momiao Xiong, Yin Yao Shugart, and Li Jin. "Efficient test for nonlinear dependence of two continuous variables." BMC bioinformatics 16 (2015): 1-8.

* cited by examiner

*Primary Examiner* — John H Le
(74) *Attorney, Agent, or Firm* — Bell & Manning, LLC

(57) ABSTRACT

A computing device learns a best topological order vector of a plurality of variables. A target variable and zero or more input variables are defined. (A) A machine learning model is trained with observation vectors using the target variable and the zero or more input variables. (B) The machine learning model is executed to compute an equation loss value. (C) The equation loss value is stored with the identifier. (D) The identifier is incremented. (E) (A) through (D) are repeated a plurality of times. (F) A topological order vector is defined. (G) A loss value is computed from a subset of the stored equation loss values based on the topological order vector. (F) through (G) are repeated for each unique permutation of the topological order vector. A best topological order vector is determined based on a comparison between the loss value computed for each topological order vector in (G).

30 Claims, 20 Drawing Sheets

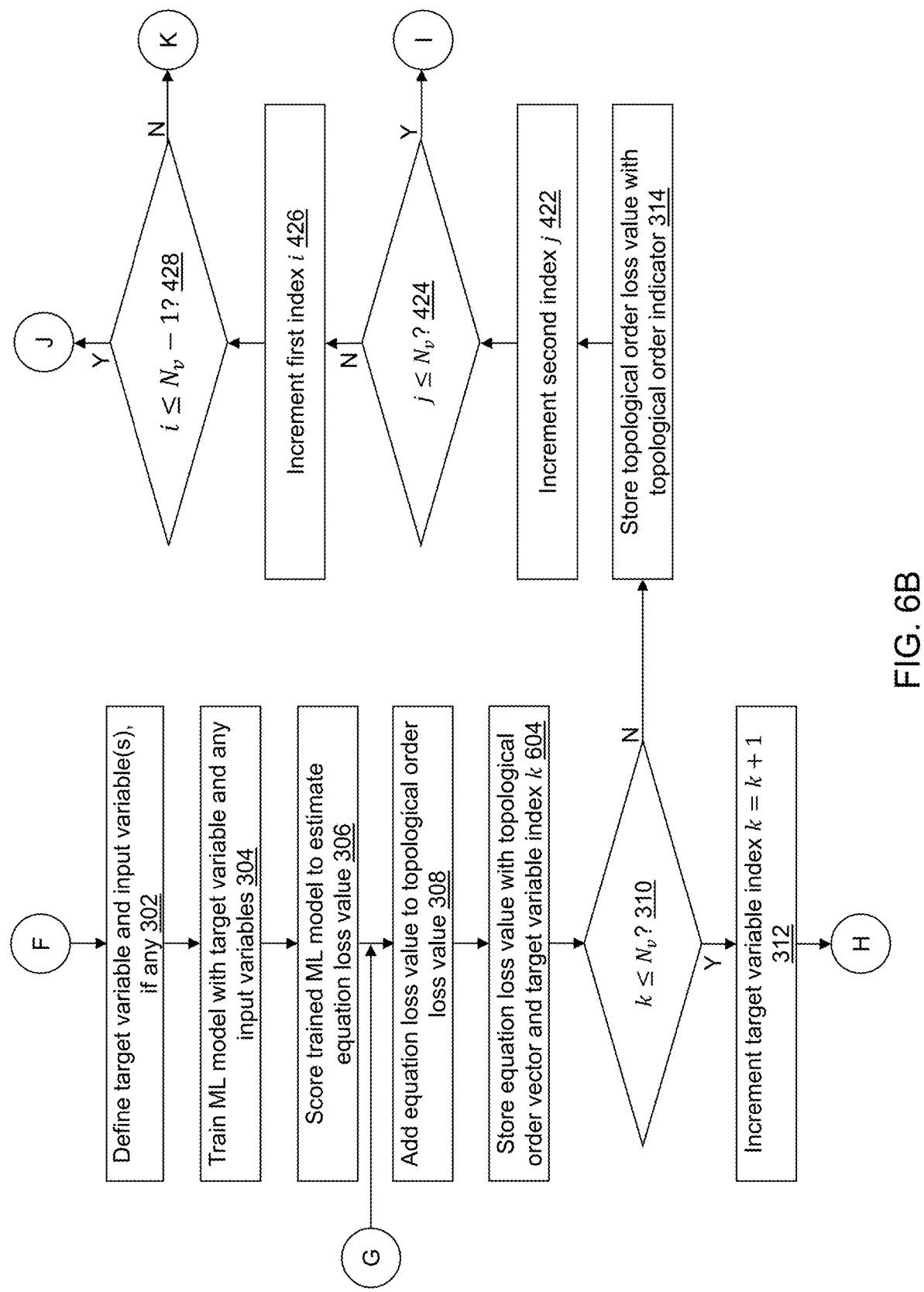

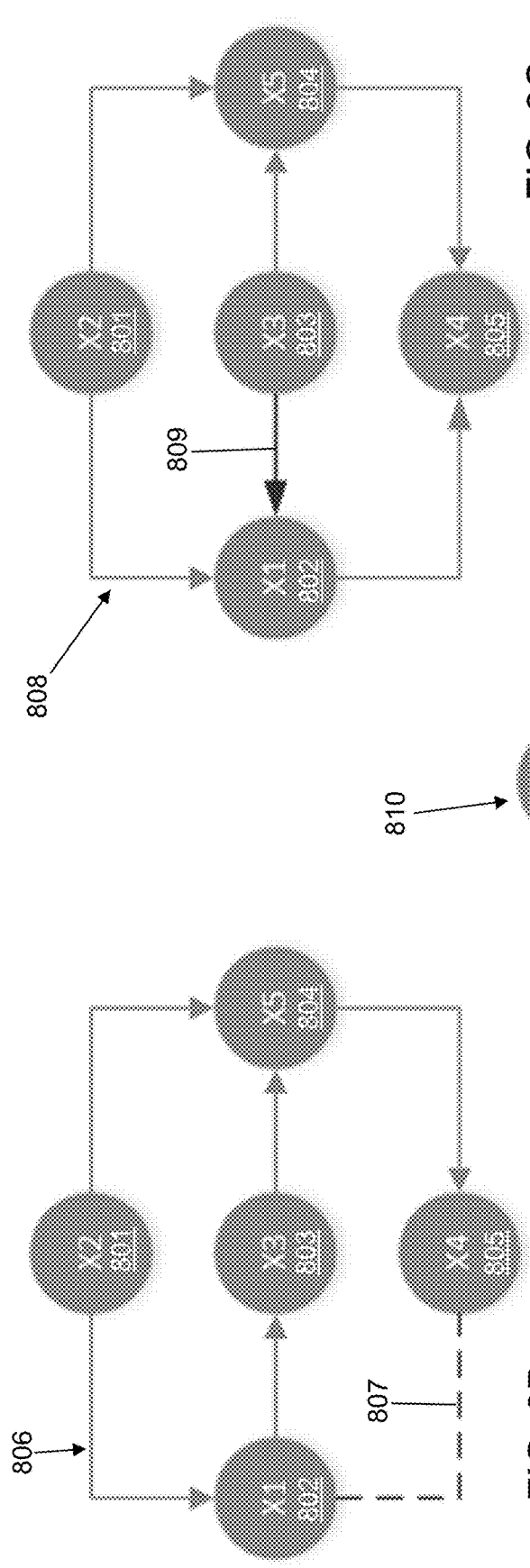
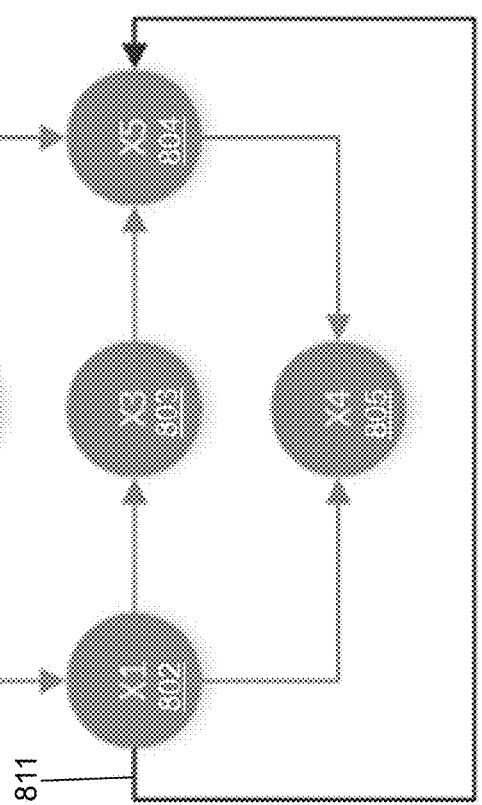
FIG. 8B
FIG. 8C
FIG. 8D

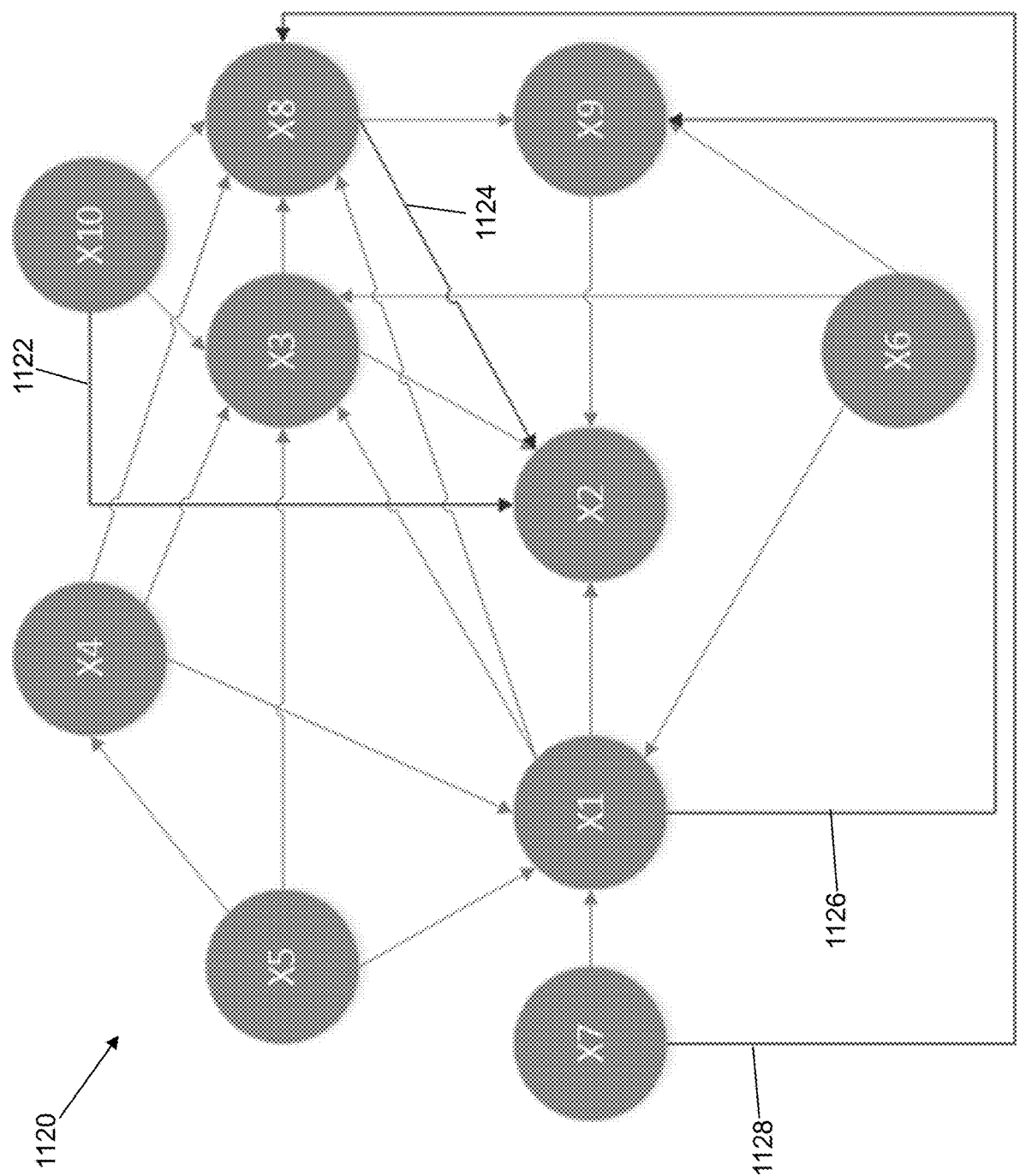

TOPOLOGICAL ORDER DETERMINATION USING MACHINE LEARNING

CROSS-REFERENCE TO RELATED APPLICATIONS

The present application claims the benefit of and priority under 35 U.S.C. § 119(e) to U.S. Provisional Patent Application No. 63/529,849 filed on Jul. 31, 2023, the entire contents of which are hereby incorporated by reference.

BACKGROUND

In a directed acyclic graph (DAG), a vertex (or a node) can represent a variable. The edges and their directions can be expressed through an adjacency matrix W: if there is an edge from vertex i to vertex j, the element $w_{ij}=1$; otherwise, $w_{ij}=0$. The DAG is critical for causal inference, which has been widely applied in many fields, such as machine learning, artificial intelligence (AI), medicine, economics, finance, and so on. However, typically the structure of a DAG is provided by a subject matter expert because learning the DAG structure from a dataset is a well-known NP-hard problem given that the search space is combinatorial and scales super-exponentially with the number of variables. For example, for a dataset with 5 variables, there are 29,281 possible DAGs; for a dataset with 10 variables, there are 4.175E18 possible DAGs; and for a dataset with 20 variables, there are 2.345E72 possible DAGs, thus making the DAG learning process computationally difficult, if not computationally infeasible.

A first step in the DAG learning process may be determination of a topological order of the variables. Determination of the topological order of the variables reduces the search space for the DAG from being super-exponential with the number of variables to being exponential with the number of variables. A topological order of the DAG defines an order of the nodes so that one node's parent set is a subset of the nodes whose orders are lower than the order of that node. For example, a variable order {X2, X1, X3, X5, X4} for the DAG is equivalent to a topological order vector r=(2,1,3,5,4). Existing methods for determining a topological order of the variables cannot process nonlinear relationships between variables and additive scalar errors that may exist in data stored in the dataset being analyzed.

SUMMARY

In an example embodiment, a non-transitory computer-readable medium is provided having stored thereon computer-readable instructions that, when executed by a computing device, cause the computing device to learn a topological order of a plurality of variables. (A) A target variable and zero or more input variables are defined from a plurality of variables based on an identifier. (B) A machine learning model is trained with a plurality of observation vectors using the defined target variable and the zero or more input variables. Each observation vector of the plurality of observation vectors includes a variable value for each variable of the plurality of variables. (C) The trained machine learning model is executed with a second plurality of observation vectors using the defined target variable and the zero or more input variables to compute an equation loss value. Each observation vector of the second plurality of observation vectors includes the variable value for each variable of the plurality of variables. (D) The computed equation loss value is stored in association with the identifier. (E) The identifier is incremented. (F) (B) through (E) are repeated a plurality of times. (G) A topological order vector is defined. The topological order vector includes an indicator for each variable of the plurality of variables in an order defined such that each variable's parent set is a subset of variables listed in the topological order vector whose order is lower. (H) A topological order loss value is computed from a subset of the computed equation loss values stored in (D) based on the defined topological order vector. (G) through (H) are repeated for each unique permutation of the topological order vector defined in (G). A best topological order vector is determined based on a comparison between the topological order loss value computed for each topological order vector in (H). The determined best topological order vector is output to describe a hierarchical relationship between the plurality of variables.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to learn a topological order of a plurality of variables.

In an example embodiment, a method of learning a topological order of a plurality of variables is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 6A through 6C depict a flow diagram illustrating examples of operations performed by a fourth topological order learning application of the topological order learning device of FIG. 1 in accordance with an illustrative embodiment.

FIG. 8B depicts a learned DAG with a missing connection in accordance with an illustrative embodiment.

FIG. 8C depicts a learned DAG with a connection with a wrong direction in accordance with an illustrative embodiment.

FIG. 8D depicts a learned DAG with an extra connection in accordance with an illustrative embodiment.

FIG. 11C shows a DAG determined using the operations of FIGS. 10A and 10B in accordance with an illustrative embodiment.

DETAILED DESCRIPTION

Input data 124 (shown referring to FIG. 1) may include, for example, a plurality of rows and a plurality of columns. The plurality of rows may be referred to as observation vectors or records (observations), and the columns may be referred to as variables. In an alternative embodiment, input data 124 may be transposed. The plurality of variables defines a vector x; for each observation vector i=1, 2, ..., N, where N is a number of the observation vectors included in input data 124. Each vector $x_i$ includes a value $x_{i,j}$ for each variable j=1, ..., $N_v$ to include in a directed acyclic graph (DAG) to be learned, where $N_v$ is a number of a plurality of variables included in input data 124 and used to learn the DAG.

Input data 124 may include additional variables that are not included in the plurality of variables. One or more variables of the plurality of variables may describe a characteristic of a physical object. For example, if input data 124 include data related to operation of a vehicle, the variables may include a type of vehicle, an oil pressure, a speed, a gear indicator, a gas tank level, a tire pressure for each tire, an engine temperature, a radiator level, etc.

Figure 8A:
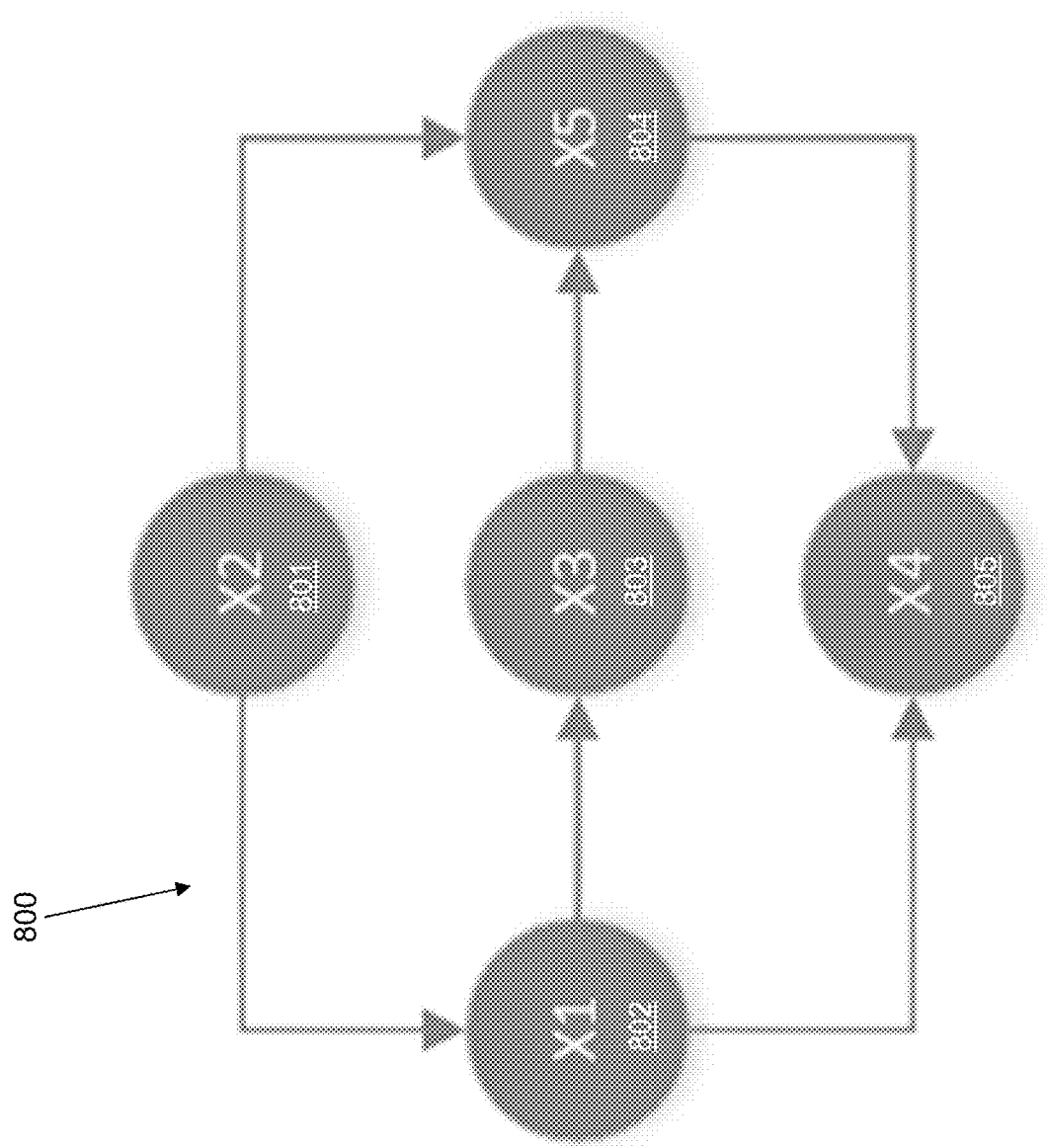
FIG. 8A depicts a DAG in accordance with an illustrative embodiment.

A graph consists of nodes (also known as vertices) and edges, and the DAG is a kind of graph such that (1) each edge has a direction from one node to another, and (2) there is no directed loop. A directed loop or cycle occurs when starting from one node and traveling along the directed edges, a starting node can be reached. Referring to FIG. 8A, a DAG 800 is shown in accordance with an illustrative embodiment. DAG 800 includes a first node 801 associated with a variable X2, a second node 802 associated with a variable X1, a third node 803 associated with a variable X3, a fourth node 804 associated with a variable X5, and a fifth node 805 associated with a variable X4. Values for variable X2, variable X1, variable X3, variable X5, and variable X4 may be included in input data 124 for each observation vector, where $N_v$=5. For example, variable X4 represents a vector of values $x_{i,4}$ for each observation vector i=1, ..., N.

When there is a directed edge from a node i to a node j, node i is a parent of node j, or equivalently, node j is a child of node i. Based on the directed edges of DAG 800, first node 801 is a parent of second node 802 and of third node 803; second node 802 is a parent of third node 803 and of fifth node 805; third node 803 is a parent of fourth node 804; and fourth node 804 is a parent of fifth node 805. Because a variable is associated with each node, variable X2 has no parent; variable X2 is a parent of variable X1 and of variable X5; variable X1 is a parent of variable X3 and of variable X4; variable X3 is a parent of variable X5; variable X5 is a parent of variable X4; and variable X4 has no children. All parents of a node construct a parent set of that node. Table 1 below summarizes the parent set for each variable included in DAG 800.

TABLE 1

| Variable | Parent set PA |
|---|---|
| X1 | {X2} |
| X2 | { } |
| X3 | {X1} |
| X4 | {X1, X5} |
| X5 | {X2, X3} |

A topological order r of a DAG defines an order of the nodes (variables) so that one node's parent set is a subset of the nodes whose orders are lower than the order of that node or $PA_{r_i} \subseteq \{X_{r_j}|j<i\}$, where $r_i$ is an $i^{th}$ topological order for node $r_i$. For example, a variable order {X2, X1, X3, X5, X4} for DAG 800 is equivalent to a topological order vector r=(2,1,3,5,4). For illustration, a parent set X2 is the subset of variables listed in the topological order vector whose order is lower than the order of X1; a parent set X2, X1, X3 is the subset of variables listed in the topological order vector whose order is lower than the order of X5, etc. A target variable X2 has zero input variables from the plurality of variables based on the topological order vector r=(2,1,3,5,4). A target variable X3 has two input variables, X2 and X1, from the plurality of variables based on the topological order vector r=(2,1,3,5,4). A target variable X4 has four input variables, X2, X1, X3 and X5, from the plurality of variables based on the topological order vector r=(2,1,3,5,4).

DAG structure learning defines a graph structure where each node is associated with a variable in one-to-one fashion. DAG structure learning is based on observation vectors included in input data 124 where each observation vector has observation values for each variable. The DAG learning process estimates whether an edge exists between any two nodes (variables) and the direction of that edge if the edge exists based on constraints or scores or both.

Errors may result when a DAG is learned. For example, referring to FIG. 8B, a first learned DAG 806 has a missing connection 807 relative to DAG 800 in accordance with an illustrative embodiment. For example, referring to FIG. 8C, a second learned DAG 808 has a connection 809 that is in the wrong direction relative to DAG 800 in accordance with an illustrative embodiment. For example, referring to FIG. 8D, a third learned DAG 810 has an extra connection 811 relative to DAG 800 in accordance with an illustrative embodiment.

A topological order learning application 122 (shown referring to FIG. 1) learns the best topological order by training and scoring a machine learning model using observation vectors from input data 124. A DAG learning application 722 (shown referring to FIG. 7) learns a DAG by training and scoring a machine learning model using observation vectors from input data 124 using the best topological order determined by topological order learning application 122. Topological order learning application 122 and DAG learning application 722 can be applied in a distributed computing environment, for example, to support big data applications.

A general form of a structural causal model that can be graphically presented using a DAG is $x_i = f_i(x_i^{(parent)}, \vec{\varepsilon}_i)$, $i=1, \ldots, N$, $(\vec{\varepsilon}_1, \ldots, \vec{\varepsilon}_N) \sim p(\cdot)$, $x_i^{(parent)} \equiv \{x_i^{(1)}, \ldots, x_i^{(J_i)}\}$. Existing DAG learning methods cannot compute a solution when (1) $x_i = f_i(x_i^{(parent)}) + \varepsilon_i$, $\varepsilon_i \sim p_i(\cdot)$, $\varepsilon_i \perp \varepsilon_k$ if $i \neq k$, $i, k = 1, \ldots, N$, which occurs when there are nonlinear relationships between variables and additive scalar errors and $x_i$ is a continuous variable; or (2) $Pr(x_i = I) = f_i(x_i^{(parent)}, I)$, $i = 1, \ldots, N$, which occurs when the probability of $x_i$ being an integer I is defined as a nonlinear function of its parents when $x_i$ is a discrete variable. Topological order learning application 122 and DAG learning application 722 can be applied to compute a solution when there are nonlinear relationships between variables and additive scalar errors by using a machine learning (ML) model to compute loss (or the so called score) to select a solution.

Figure 1:
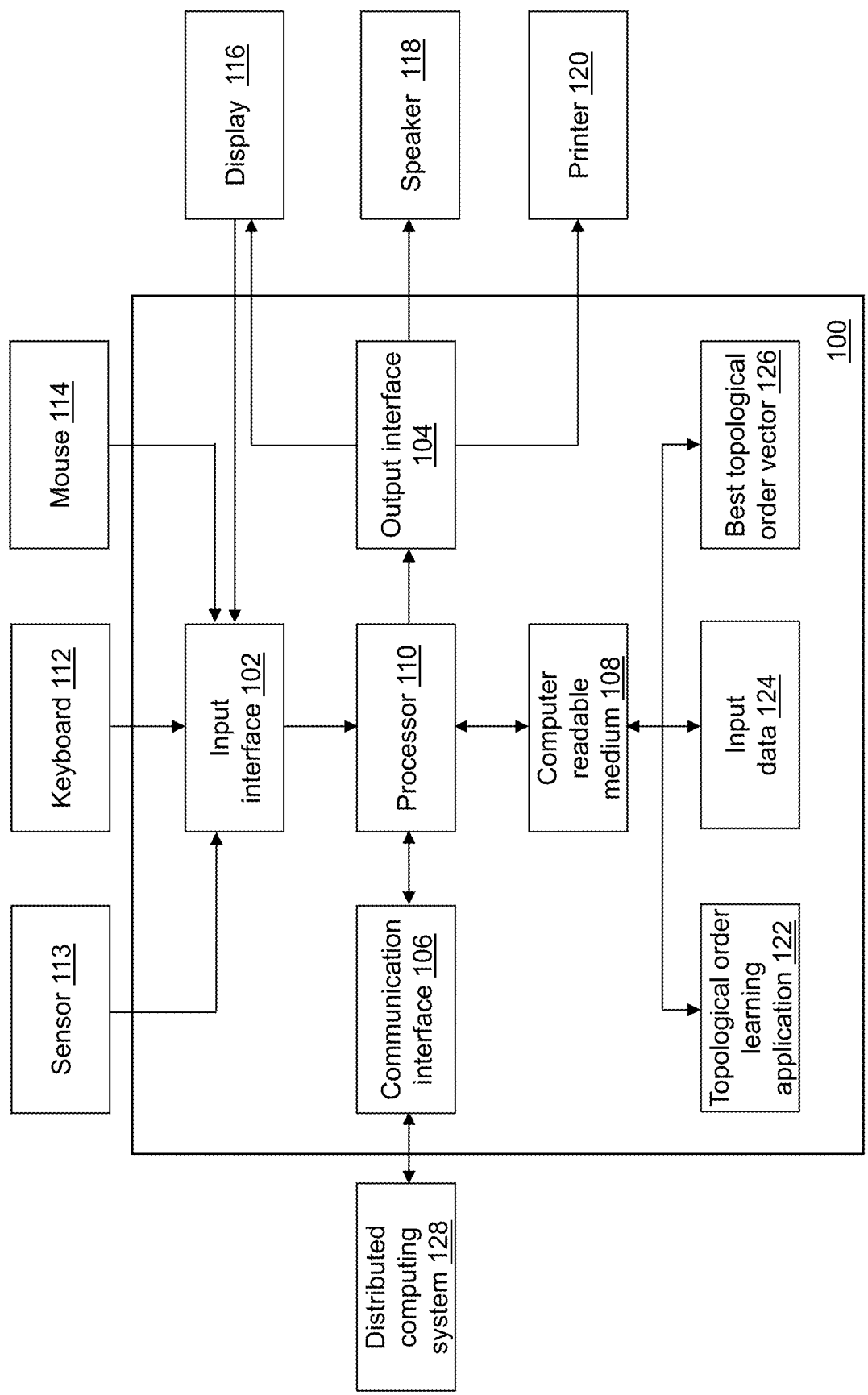
FIG. 1 depicts a block diagram of a topological order learning device in accordance with an illustrative embodiment.

Referring to FIG. 1, a block diagram of a topological order learning device 100 is shown in accordance with an illustrative embodiment. Topological order learning device 100 may include an input interface 102, an output interface 104, a communication interface 106, a non-transitory computer-readable medium 108, a processor 110, topological order learning application 122, input data 124, and a best topological order vector 126. Topological order learning application 122 learns a best topological order from observations stored in input data 124. Fewer, different, and/or additional components may be incorporated into topological order learning device 100.

Input interface 102 provides an interface for receiving information from the user or another device for entry into topological order learning device 100 as understood by those skilled in the art. Input interface 102 may interface with various input technologies including, but not limited to, a keyboard 112, a sensor 113, a mouse 114, a display 116, a track ball, a keypad, one or more buttons, etc. to allow the user to enter information into topological order learning device 100 or to make selections presented in a user interface displayed on display 116.

The same interface may support both input interface 102 and output interface 104. For example, display 116 comprising a touch screen provides a mechanism for user input and for presentation of output to the user. Topological order learning device 100 may have one or more input interfaces that use the same or a different input interface technology. The input interface technology further may be accessible by topological order learning device 100 through communication interface 106.

Output interface 104 provides an interface for outputting information for review by a user of topological order learning device 100 and/or for use by another application or device. For example, output interface 104 may interface with various output technologies including, but not limited to, display 116, a speaker 118, a printer 120, etc. Topological order learning device 100 may have one or more output interfaces that use the same or a different output interface technology. The output interface technology further may be accessible by topological order learning device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Topological order learning device 100 may have one or more communication interfaces that use the same or a different communication interface technology. For example, topological order learning device 100 may support communication using an Ethernet port, a Bluetooth® antenna, a telephone jack, a USB port, etc. Data and/or messages may be transferred between topological order learning device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Topological order learning device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Topological order learning device 100 also may have one or more drives that support the loading of a memory media such as a CD, DVD, an external hard drive, etc. One or more external hard drives further may be connected to topological order learning device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming languages, scripting languages, assembly languages, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Topological order learning device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Topological order learning application 122 may perform operations associated with learning a best topological order to describe a hierarchical relationship between variables of input data 124. Some or all of the operations described herein may be embodied in topological order learning application 122. The operations may be implemented using hardware, firmware, software, or any combination of these methods.

Referring to the example embodiment of FIG. 1, topological order learning application 122 is implemented in software (comprised of computer-readable and/or computer-executable instructions) stored in computer-readable medium 108 and accessible by processor 110 for execution of the instructions that embody the operations of topological order learning application 122. Topological order learning application 122 may be written using one or more programming languages, assembly languages, scripting languages, etc. Topological order learning application 122 may be integrated with other analytic tools. As an example, topological order learning application 122 may be part of an integrated data analytics software application and/or software architecture such as that offered by SAS Institute Inc. of Cary, North Carolina, USA. More specifically, topological order learning application 122 may be integrated with DAG learning application 722. Merely for illustration, topological order learning application 122 may be implemented using or integrated with one or more SAS software tools such as Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS® Econometrics, and SAS In-Memory Statistics for Hadoop®, etc. all of which are developed and provided by SAS Institute Inc. of Cary, North Carolina, USA. Data mining, statistical analytics, and response prediction are practically applied in a wide variety of industries to solve technical problems.

Topological order learning application 122 may be implemented as a Web application. For example, topological order learning application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Sensor 113 may measure a physical quantity in an environment to which sensor 113 is associated and generate a corresponding measurement datum that may be associated with a time that the measurement datum is generated. The measurement datum may be stored in input data 124. Illustrative sensors include a pressure sensor, a temperature sensor, a position or location sensor, a voltage sensor, a current sensor, a frequency sensor, a humidity sensor, a dewpoint sensor, etc. that may be mounted to various components used as part of a system.

Input data 124 may include data captured as a function of time for one or more physical objects. The data stored in input data 124 may be captured at different time points, periodically, intermittently, when an event occurs, etc. Input data 124 may include data captured at a high data rate such as 200 or more observation vectors per second for one or more physical objects. One or more columns of input data 124 may include a time and/or date value. Input data 124 may include data captured under normal and abnormal operating conditions of the physical object.

The data stored in input data 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, North Carolina, USA. For example, data stored in input data 124 may be generated as part of the Internet of Things (IOT), where things (e.g., machines, devices, phones, sensors) can be connected to networks and the data from these things collected and processed within the things and/or external to the things before being stored in input data 124. For example, the IoT can include sensors in many different devices and types of devices, and high value analytics can be applied to identify hidden relationships and drive increased efficiencies. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input data 124.

The data stored in input data 124 may include any type of content represented in any computer-readable format such as binary, alphanumeric, numeric, string, markup language, etc. The content may include textual information, numeric information, etc. that further may be encoded using various encoding techniques as understood by a person of skill in the art.

Input data 124 may be stored on computer-readable medium 108 or on one or more computer-readable media of distributed computing system 128 and accessed by topological order learning device 100 using communication interface 106 and/or input interface 102. Input data 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input data 124 may be stored using various data structures as known to those skilled in the art including one or more files of a file system, a relational database, one or more tables of a system of tables, a structured query language database, etc. on topological order learning device 100 or on distributed computing system 128.

Topological order learning device 100 may coordinate access to input data 124 that is distributed across distributed computing system 128 that may include one or more computing devices. For example, input data 124 may be stored in a cube distributed across a grid of computers as understood by a person of skill in the art. As another example, input data 124 may be stored in a multi-node Hadoop® class. For instance, Apache™ Hadoop® is an open-source software framework for distributed computing supported by the Apache Software Foundation. As another example, input data 124 may be stored in a cloud of computers and accessed using cloud computing technologies, as understood by a person of skill in the art. The SAS® LASR™ Analytic Server may be used as an analytic platform to enable multiple users to concurrently access data stored in input data 124. The SAS Viya open, cloud-ready, in-memory architecture also may be used as an analytic platform to enable multiple users to concurrently access data stored in input data 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2:
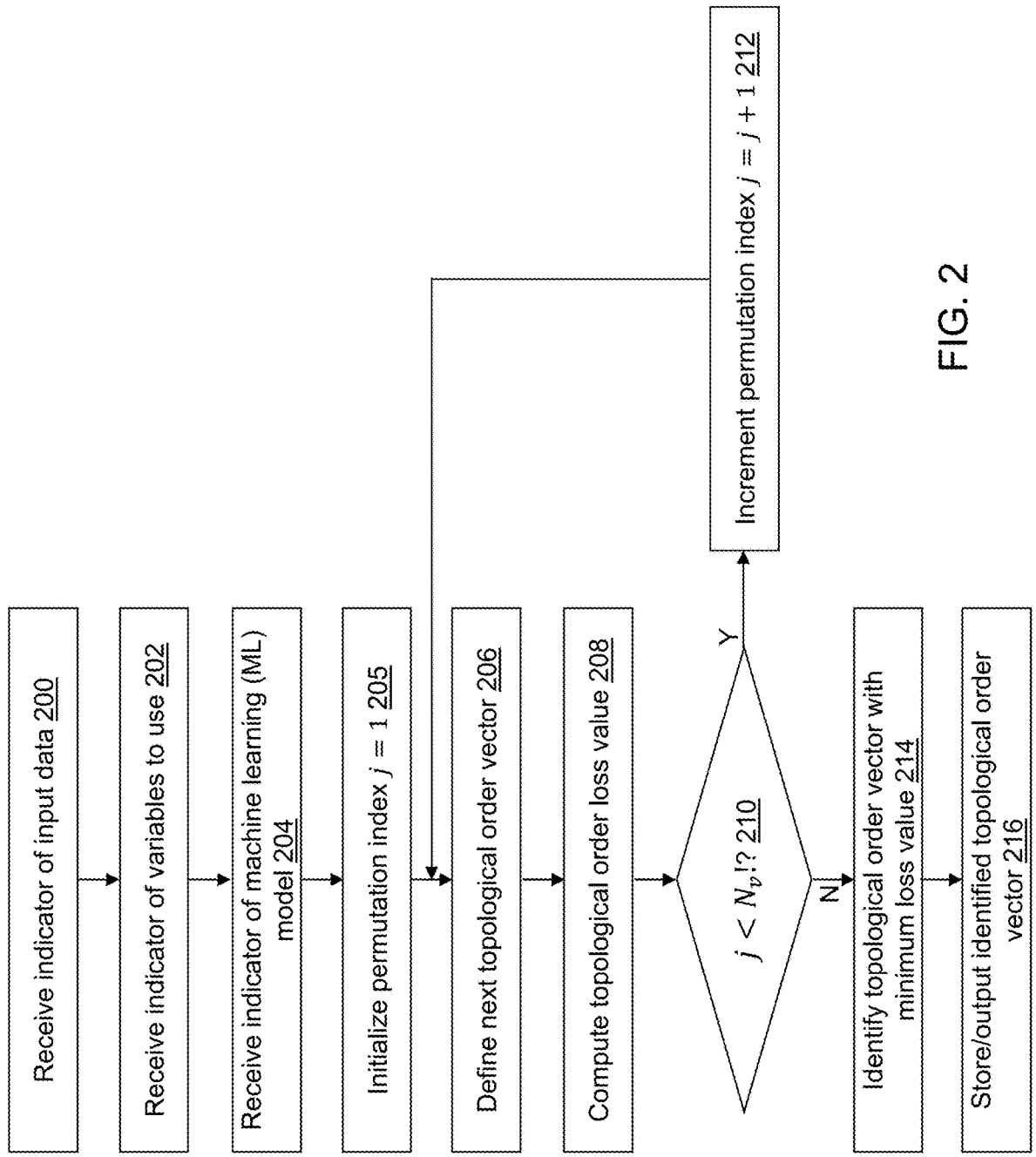
FIG. 2 depicts a flow diagram illustrating examples of operations performed by a first topological order learning application of the topological order learning device of FIG. 1 in accordance with an illustrative embodiment.
Figure 3:
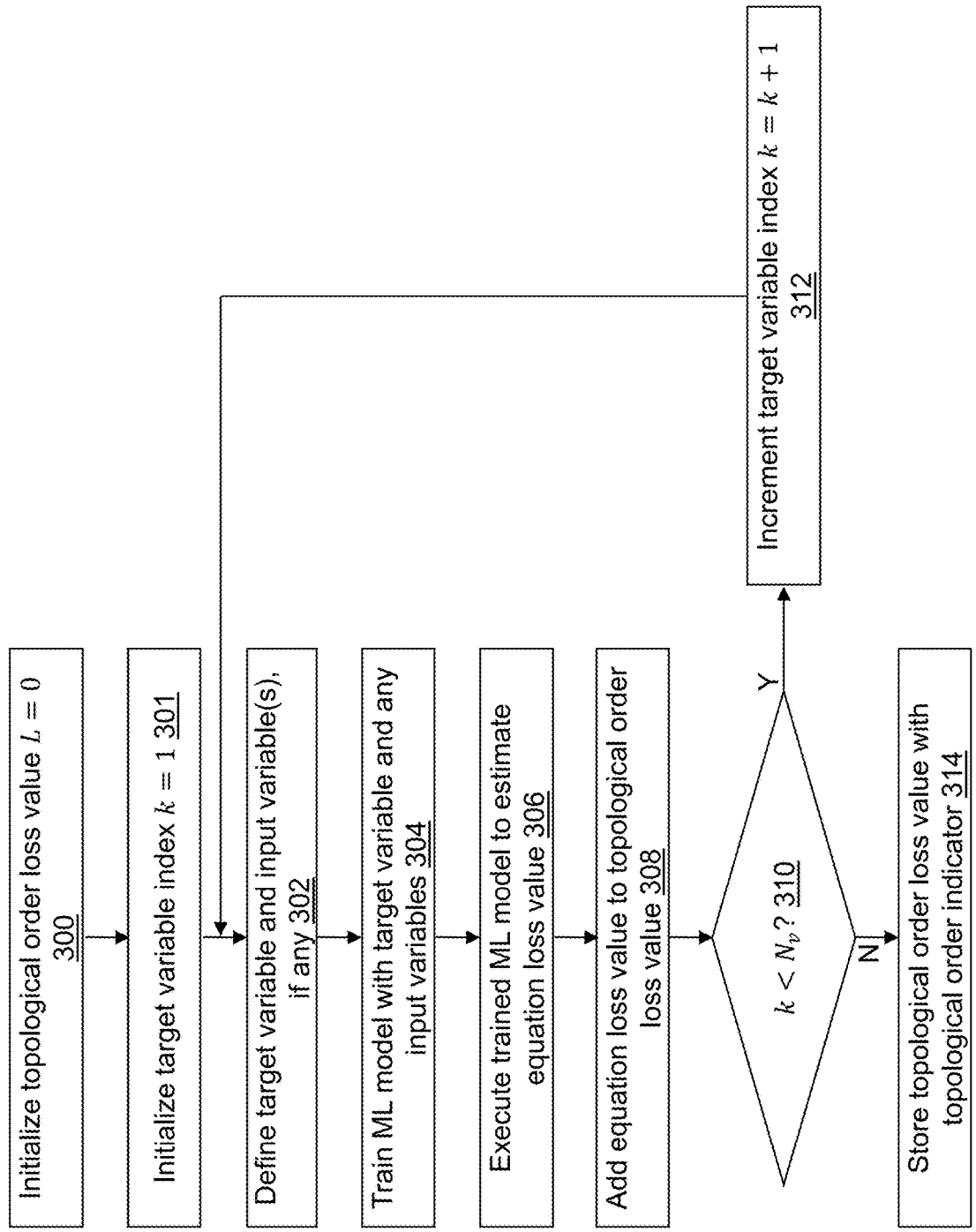
FIG. 3 depicts a flow diagram illustrating examples of operations performed by the first topological order learning application of FIG. 2 to compute a loss value in accordance with an illustrative embodiment.

Referring to FIGS. 2, 3, 4A, 4B, 5A, 5B, 6A, 6B, and 6C, example operations associated with topological order learning application 122 are described. Additional, fewer, or different operations may be performed depending on the embodiment of topological order learning application 122. For example, FIGS. 2, 4A, 4B, 5A, 5B, 6A, 6B, and 6C describe four different processes that learn a best topological order. FIG. 3 describes a process for computing a topological order loss value.

Topological order learning application 122 determines a best topological order of the variables when nonlinear relationships between variables and additive scalar errors exist in the observation vectors stored in input data 124. The order of presentation of the operations of FIGS. FIGS. 2, 3, 4A, 4B, 5A, 5B, 6A, 6B, and 6C is not intended to be limiting. Some of the operations may not be performed in some embodiments. Although some of the operational flows are presented in sequence, the various operations may be performed in various repetitions and/or in other orders than those that are illustrated. For example, a user may execute topological order learning application 122, which causes presentation of a first user interface window, which may include a plurality of menus and selectors such as drop-down menus, buttons, text boxes, hyperlinks, etc. associated with topological order learning application 122 as understood by a person of skill in the art. The plurality of menus and selectors may be accessed in various orders. An indicator may indicate one or more user selections from a user interface, one or more data entries into a data field of the user interface, one or more data items read from a command line, one or more data items read from computer-readable medium 108, one or more data items otherwise defined with one or more default values, etc. that are received as an input by topological order learning application 122 or are predefined by an operation of topological order learning application 122. Some of the operational flows further may be performed in parallel, for example, using a plurality of threads and/or a plurality of computing devices such as may be included in distributed computing system 128.

Referring to FIG. 2, in an operation 200, a first indicator may be received that indicates input data 124. For example, the first indicator indicates a location and a name of input data 124. As an example, the first indicator may be received topological order learning application 122 after selection from a user interface window or after entry by a user into a user interface window. In an alternative embodiment, input data 124 may not be selectable. For example, a most recently created dataset may be used automatically.

In an operation 202, a second indicator may be received that indicates the plurality of variables to use from input data 124. For example, the second indicator may indicate a plurality of column numbers or a plurality of column names. In an illustrative embodiment, all of the variables included in input data 124 may be included in the plurality of variables by default or without a user selection of the plurality of variables. Irrespective of the column number from which values for a specific variable are read, each variable of the plurality of variables may be sequentially assigned a unique index j from j=1, . . . , $N_v$.

In an operation 204, a third indicator may be received that indicates a ML model to train. For example, the third indicator indicates a name of a ML model and parameters associated with training and scoring the ML model. The third indicator may be received by topological order learning application 122 from a user interface window or after entry by a user into a user interface window. A default value for the model may further be stored, for example, in computer-readable medium 108. As an example, a model type may be selected from "SVM", "Neural Network", "Forest", "Gradient Boosting", "Decision Tree", etc. The model type indicated by "SVM" may refer to a support vector machine (SVM) model type. The model type indicated by "Neural Network" may refer to a neural network model type. The model type indicated by "Forest" may refer to a random forest model type. The model type indicated by "Gradient Boosting" may refer to a gradient boosting model type. The model type indicated by "Decision Tree" may refer to a decision tree model type. For example, a default model type may be indicated by "Neural Network". Of course, the model type may be labeled or selected in a variety of different manners by the user as understood by a person of skill in the art. In an alternative embodiment, the model type may not be selectable, and a single model type is implemented by topological order learning application 122. For example, the model type indicated as "Neural Network" may be used by default or without allowing a selection.

The third indicator further indicates one or more hyperparameters to use for training and validating (scoring) the indicated model type and/or values for an automatic tuning method (autotune option) as well as other training options such an objective function, training stop criteria, etc. Hyperparameters define values or various options that govern a training/validating process based on the model type. The default values of these hyperparameters may not be suitable for all applications. To reduce the effort in adjusting these hyperparameters, an automatic tuning process may be used to identify the best settings for the hyperparameters though the hyperparameters may optionally be selected as an input option by a user. For example, L1 regularization and k-fold techniques may be used to train and validate the ML mode. The third indicator may include parameters that define these types of validation techniques.

For illustration, the ML model may be a deep neural network model type for which an architecture is defined that includes a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a detection threshold, etc. may be defined as hyperparameters for training the neural network. The architecture may define a convolutional neural network, a deep, fully connected neural network, a recurrent neural network, etc.

In an operation 205, a permutation index j is initialized, for example, using j=1.

In an operation 206, a next topological order vector t is defined where the vector includes $N_v$ entries that include a distinct permutation of indices that indicate an order of the plurality of variables, where $N_v!$ distinct permutations can be defined. For example, a first topological order vector $t_1$ defined on a first iteration of operation 206 may be a first permutation of the $N_v$ indices such as $t_1=[1, \ldots, N_v]$; a second topological order vector $t_2$ defined on a second iteration of operation 206 may be a second permutation of the $N_v$ indices such as $t_2=[2, \ldots, N_v, 1]$; a third topological order vector $t_3$ defined on a third iteration of operation 206 may be a third permutation of the $N_v$ indices such as $t_3=[3, \ldots, N_v, 1, 2]$; etc. until $N_v!$ permutations of the $N_v$ variable indices have been defined. For illustration, a SAS function ALLPERM provided with SAS/IML® that was developed by SAS Institute Inc. of Cary, North Carolina, USA generates all permutations of a set of $N_v$ elements and returns a matrix with $N_v!$ rows and $N_v$ columns.

In an operation 208, a topological order loss value is computed for the topological order vector t defined in a most recent iteration of operation 206. Though a loss is computed, the topological order loss value may instead refer to an accuracy value in an alternative embodiment. Referring to FIG. 3, in an operation 300, a topological order loss value L is initialized, for example, using L=0.

In an operation 301, a target variable index k is initialized, for example, using k=1.

In an operation 302, a target variable and zero or more input variables are defined based on the topological order vector t and the target variable index k. For example, the target variable is defined as the variable indicated by the $k^{th}$ entry of the topological order vector t. Any input variables are defined as preceding entries of the topological order vector t in the order defined from l=1, . . . , k−1. For illustration, on a first iteration of operation 302, the target variable is indicated by a first entry of topological order vector t and there are no input variables; on a second iteration of operation 302, the target variable is indicated by a second entry of topological order vector t and there is a single input variable indicated by the first entry of topological order vector t; on a third iteration of operation 302, the target variable is indicated by a third entry of topological order vector t and there are two input variables indicated by the first and second entries of topological order vector t in that order.

In an operation 304, an ML model is trained using observation vectors included in input data 124 based on the model characteristics and training parameters indicated in operation 204 and using the target variable and any input variables defined in operation 302. For example, the model may be trained and validated using another application that is distinct from topological order learning application 122 or is integrated with topological order learning application 122. For illustration, a TREESPLIT Procedure included in SAS® Visual Data Mining and Machine Learning: Statistical Procedures developed and provided by SAS Institute Inc. of Cary, North Carolina, USA may be used for a decision tree model type; a FOREST procedure included in SAS® Visual Data Mining and Machine Learning: Data Mining and Machine Learning Procedures developed and provided by SAS Institute Inc. of Cary, North Carolina, USA may be used for a random forest model type; a GRADBOOST procedure included in SAS® Visual Data Mining and Machine Learning: Data Mining and Machine Learning Procedures developed and provided by SAS Institute Inc. of Cary, North Carolina, USA may be used for a gradient boosting model type; a NNET procedure included in SAS® Visual Data Mining and Machine Learning: Data Mining and Machine Learning Procedures developed and provided by SAS Institute Inc. of Cary, North Carolina, USA may be used for a gradient boosting model type; a SVMACHINE procedure included in SAS® Visual Data Mining and Machine Learning: Data Mining and Machine Learning Procedures developed and provided by SAS Institute Inc. of Cary, North Carolina, USA may be used for a support vector machine model type; a dlTrain action included in SAS® Visual Data Mining and Machine Learning may be used to train a deep Neural Network model type in SAS® Viya™ and SAS® Cloud Analytic Services (CAS), all developed and provided by SAS Institute Inc. of Cary, North Carolina, USA, and a dlTune action may be used to tune the deep neural network model; etc.

In an operation 306, the trained model is executed with observation vectors included in input data 124 based on the model characteristics and validating/testing parameters indicated in operation 204 and using the target variable and any input variables defined in operation 302 to compute an equation loss value $L_e$ as part of validating/testing the trained model. For illustration, the equation loss value $L_e$ corresponds with the loss value generated by an equation in a structural causal model such as a mean squared error though other loss functions may be used and may be indicated in operation 204.

As understood by a person of skill in the art, data for training and validating the model may be the same or different. For example, input data 124 may be distributed into one or more training datasets and one or more validating datasets on topological order learning device 100 and/or on distributed computing system 128. When the k-fold technique is used, each model evaluation process of operations 304 and 306 may be executed multiple times. For example, k training and validating executions may be performed with different training dataset subsets selected from input data 124. For example, if a number of folds value k=4, input data 124 is partitioned into four subsets A, B, C, D. For a first execution loop, all partitions except a first partition (e.g., A) are selected to form a first training dataset used in operation 304 with first partition A selected to form a testing dataset used in operation 306. For a second execution loop, all partitions except a second partition (e.g., B) are selected to form a second training dataset used in operation 304 with second partition B selected to form the testing dataset used in operation 306. For a third execution loop, all partitions except a third partition (e.g., C) are selected to form a third training dataset used in operation 304 with third partition C selected to form a testing dataset used in operation 306. For a fourth execution loop, all partitions except a fourth partition (e.g., D) are selected to form a fourth training dataset used in operation 304 with fourth partition D selected to form a testing dataset used in operation 306. Thus, the training and execution operations may be repeated k times with different training datasets used to define the trained model and the different testing datasets used to determine the loss, where each partition of input data 124 is used (K−1) times in training and one time in scoring. In an illustrative embodiment, the equation loss value $L_e$ is the sum of loss values computed using each partition to form the testing dataset used in operation 306.

In an operation 308, the equation loss value $L_e$ is added to the topological order loss value L, for example, using $L+=L_e$.

In an operation 310, a determination is made concerning whether $k<N_v$, which indicates that there is at least one additional equation to process. When $k<N_v$, processing continues in an operation 312 to determine a next equation to evaluate for the topological order vector t. When $k \geq N_v$, processing continues in an operation 314.

In operation 312, the target variable index k is incremented, for example, using k=k+1, and processing continues in operation 302.

In operation 314, the topological order loss value L that includes the loss value computed by executing each trained model with different subsets of input variables is stored in association with an indicator of the topological order vector t. The indicator may be the topological order vector t or another index such as the permutation index to uniquely identify the topological order vector t. Processing continues with a next operation after the operation to compute the topological order loss value L. For example, when operation 208 triggers operations 300 through 314, processing continues in an operation 210 shown referring to FIG. 2.

In operation 210, a determination is made concerning whether $j<N_v!$, which indicates that there is at least one additional topological order to process. When $j<N_v!$, processing continues in an operation 212 to determine a next topological order to process. When $j \geq N_v!$, processing continues in an operation 214.

In operation 212, the permutation index j is incremented, for example, using j=j+1, and processing continues in operation 206.

In operation 214, the topological order vector t having a minimum value for the topological order loss value L, or alternatively a maximum value for topological order loss value L that represents a measure of accuracy, is identified. For example, a minimum topological order loss value L of those stored in operation 314 is determined and the associated topological order vector t is identified.

In an operation 216, the identified topological order vector t is output or stored, for example, to best topological order vector 126 or another memory location of computer-readable medium 108. For example, when topological order learning application 122 and DAG learning application 722 are integrated, the identified topological order vector t may be provided in-memory to DAG learning application 722. In addition, or in the alternative, the identified topological order vector t may be presented on display 116, printed by printer 120, stated by speaker 118, etc.

Figure 4A:
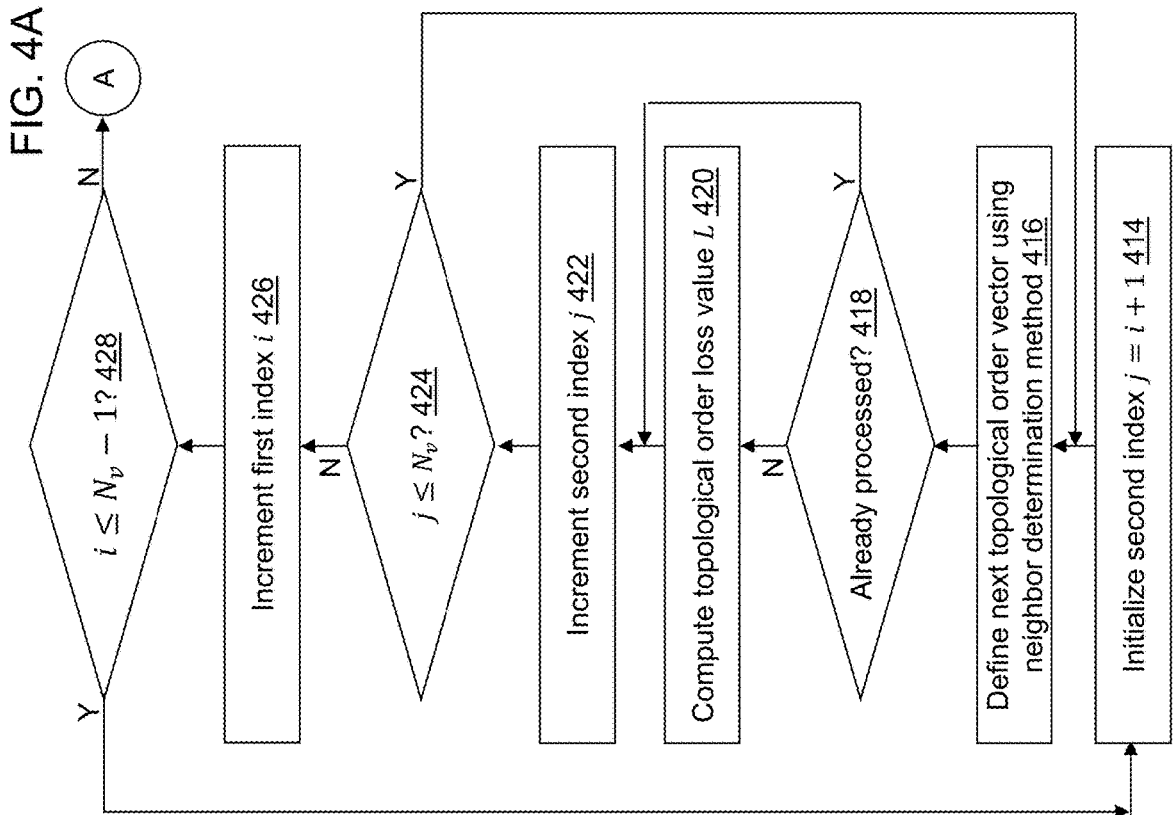
FIGS. 4A and 4B depict a flow diagram illustrating examples of operations performed by a second topological order learning application of the topological order learning device of FIG. 1 in accordance with an illustrative embodiment.
Figure 4A:
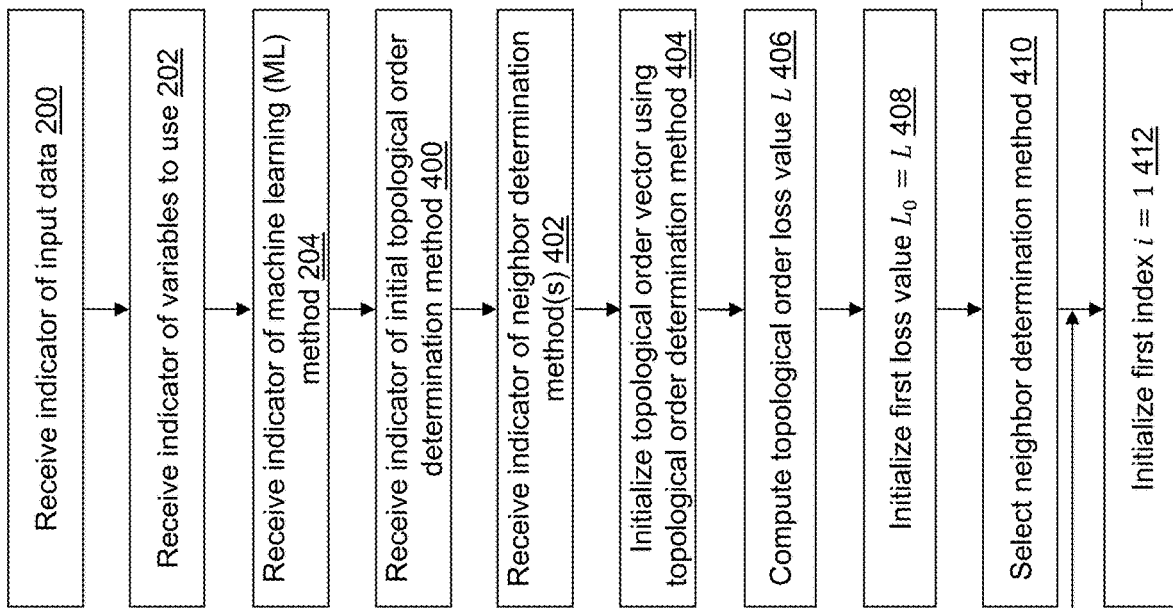
Figure 4B:
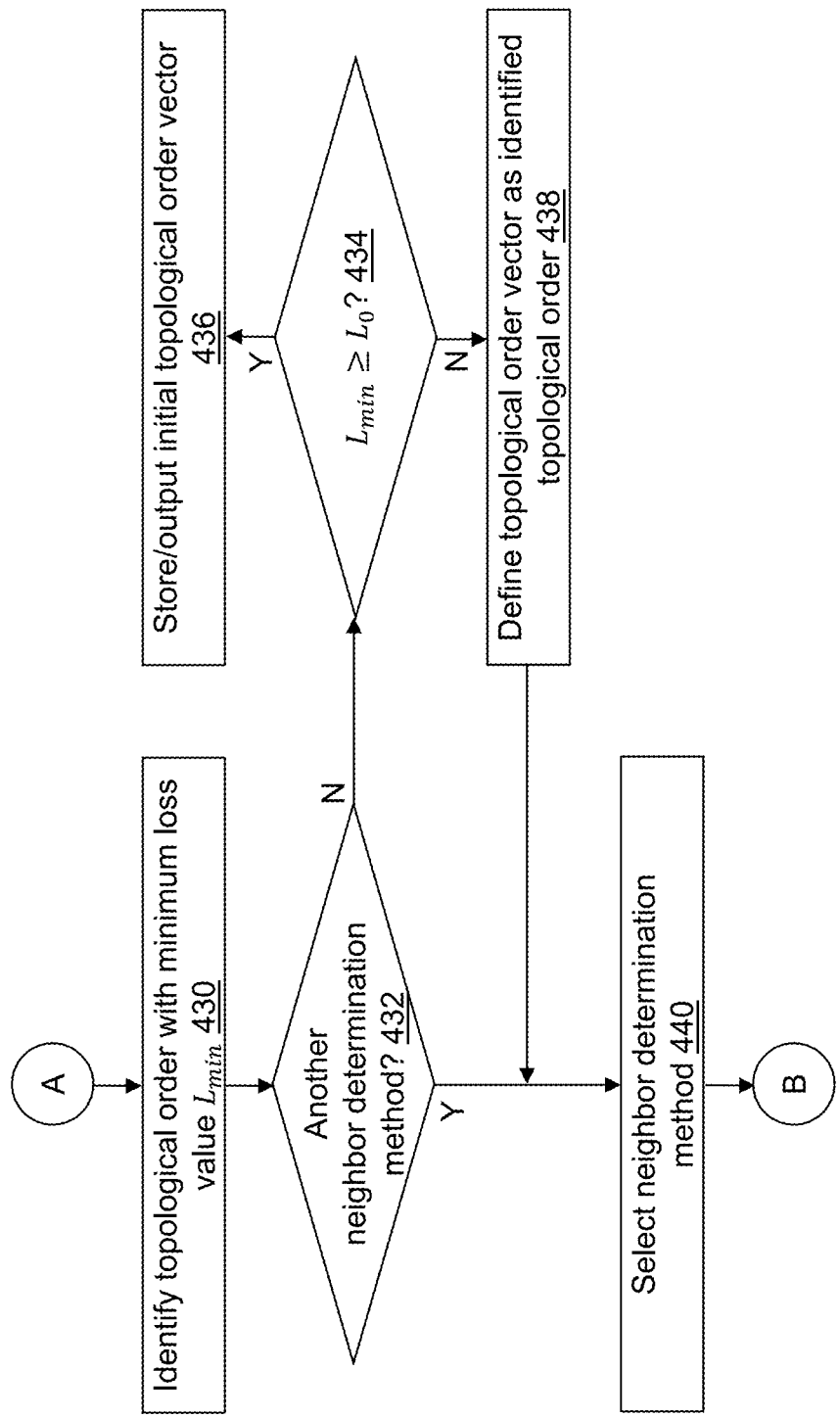

Referring to FIGS. 4A and 4B, an alternative method for determining topological order vector t using topological order learning application 122 is described. Referring to FIG. 4A, operations 200, 202, and 204 are performed.

In an operation 400, a fourth indicator may be received that indicates an initial topological order determination method used to determine an initial topological vector $t_0$ for the plurality of variables, where the topological order includes a list of the unique indexes assigned to the plurality of variables. As an example, the fourth indicator may be received by topological order learning application 122 after selection from a user interface window or after entry by a user into a user interface window. As a first example, the fourth indicator may indicate that the initial topological vector $t_0$ is defined using the variable order defined by the sequentially assigned unique indices or $t_0 = (1, 2, \ldots, N_v)$.

As a second example, the fourth indicator may indicate that the initial topological vector $t_0$ is defined directly from the fourth indicator. For example, the fourth indicator may include $t_0$ that is predefined and provided as an input. As a third example, the fourth indicator may indicate that the initial topological vector to is defined by randomly, successively selecting from remaining variables of the plurality of variables and adding them to $t_0$. As a fourth example, the fourth indicator may indicate that the initial topological vector to is defined based on an ascending variance value computed for each variable of the plurality of variables from input data 124.

A default initial topological order determination method may further be stored, for example, in computer-readable medium 108 and used automatically without a user selection using the fourth indicator. For example, a default initial topological order determination method may be the variable order, which may be a first permutation of the $N_v$ indices. Of course, the initial topological order determination method may be labeled or selected in a variety of different manners by the user as understood by a person of skill in the art. In an illustrative embodiment, the variable order may be used by default or without allowing a user selection using the fourth indicator though another default method may be used as an alternative default method.

In an operation 402, a fifth indicator may be received that indicates one or more neighbor determination methods used to define additional topological order vectors for evaluation. For example, the fifth indicator may indicate one or more names of a type of neighbor determination method. As an example, a neighbor determination method may be selected from "Move-Up", "Move-Down", "Swap", etc. For example, the fifth indicator may include a comma separated list of one or more names of neighbor determination methods such as Move-Up, Move-Down, Swap or one or more indices that each represent a unique predefined method. For example, an index of one may indicate the Move-Up neighbor determination method, an index of two may indicate the Move-Down neighbor determination method, and an index of three may indicate the Swap neighbor determination method. A default one or more neighbor determination methods may further be stored, for example, in computer-readable medium 108 and used automatically without a user selection using the fifth indicator. For example, a default one or more neighbor determination methods may be defined by the comma separated list "Move-Up, Move-Down, Swap". Of course, the neighbor determination method(s) may be labeled or selected in a variety of different manners by the user as understood by a person of skill in the art.

In an operation 404, an initial topological order vector $t_0$ is initialized using the topological order determination method indicated in operation 400. The initial topological order vector $t_0$ has $N_v$ elements. Each value of the initial topological order vector $t_0$ is one of the unique values assigned to a variable of the plurality of variables read from a column of input data 124. For example, a value of one indicates the variable read from the first column that defines the plurality of variables; a value of two indicates the variable read from the second column that defines the plurality of variables; and so on. A best topological order vector $t_b$ may be initialized as $t_b=t_0$, and a current iteration topological order vector $t_c$ may be initialized as $t_c=t_0$.

As a first example, when the fourth indicator indicates that the initial topological order vector $t_0$ is defined using the variable order, $t_0=(1, 2, \ldots, N_v)$. As a second example, when the fourth indicator indicates that the initial topological order vector $t_0$ is defined directly from the fourth indicator, $t_0=t$, where t is defined by the fourth indicator.

As a third example, when the fourth indicator indicates that the initial topological order vector $t_0$ is defined randomly by successively selecting from remaining variables of the plurality of variables and adding their associated unique index to $t_0=[t_{01}, t_{02}, \ldots, t_{0N_v}]$, $t_{01}=\text{rand}(1, 2, \ldots, N_v)$, $t_{02}$ is selected as a random draw from among the remaining $N_v$ variables excluding the variable selected for $t_{01}$, $t_{03}$ is selected as a random draw from among the remaining $N_v$ variables excluding the variables selected for $t_{01}$ and $t_{02}$, and so on, where $t_{0N_v}$ is the last unselected variable.

As a fourth example, when the fourth indicator indicates that the initial topological order vector to is defined based on an ascending variance value computed for each variable of the plurality of variables, a variance value is computed for each variable by computing a mean value $$\mu_j = \frac{1}{N}\sum_{i=1}^{N} x_{i,j}, j = 1, 2, \ldots, N_v,$$

and a variance value $$v_j = \frac{1}{N}\sum_{i=1}^{N}(x_{i,j} - \mu_j)^2, j = 1, 2, \ldots, N_v.$$

The initial topological order vector to is defined by adding the unique value associated with each variable to $t_0$ based on increasing values of the variance value $v_j$.

Similar to operation 208, in an operation 406, the topological order loss value L is computed for the initial topological order vector $t_0$ by executing operation 300 through 314.

In an operation 408, a first topological order loss value $L_0$ is initialized, for example, using $L_0=L$.

In an operation 410, a first neighbor determination method of the one or more neighbor determination methods indicated in operation 402 is selected as the neighbor determination method. For example, a first neighbor determination method may be selected from the comma separated list of one or more names or one or more indices.

In an operation 412, a first index i is initialized, for example, using i=1.

In an operation 414, a second index j is initialized, for example, using j=i+1.

In an operation 416, a next topological order vector t is determined from the current iteration topological order vector $t_c$ using the selected neighbor determination method. On a first execution of operation 416, the current iteration topological order vector $t_c$ is the initial topological order vector $t_0$. On subsequent iterations of operation 416, the current iteration topological order vector $t_c$ is the next topological order vector t defined on a most recent, previous iteration of operation 416.

When the selected neighbor determination method is Move-Up, the following logic defines the next topological order vector t based on the first and second indices i, j:

$t=t_c$ do $k=i, \ldots, j-1$ $t(k)=t_c(k+1)$ enddo $t(j)=t_c(i)$

For example, when i=2, j=5, and $t_c=(2,1,3,5,4)$, the next topological order vector using the Move-Up neighbor determination method is t=(2,3,5,4,1). For example, when the selected neighbor determination method is Move-Down, the following logic defines the next topological order vector r:

$t=t_c$ do $k=i, \ldots, j-1$ $t(k+1)=t_c(k)$ enddo $t(i)=t_c(j)$

For example, when i=2, j=5, and $r_c=(2,1,3,5,4)$, the next topological order vector using the Move-Down neighbor determination method is r=(2,4,1,3,5). For example, when the selected neighbor determination method is Swap, the following logic defines the next topological order vector t:

$t=t_c$ $t(i)=t_c(j)$ $t(j)=t_c(i)$

For example, when i=2, j=5, and $r_c=(2,1,3,5,4)$, the next topological order vector using the Swap neighbor determination method is r=(2,4,3,5,1).

In operation 418, a determination is made concerning whether the next topological order vector t has already been processed. When the next topological order vector t has not been processed, processing continues in an operation 420. When the next topological order vector t has been processed, processing continues in operation 422 to determine the next topological order vector t using the incremented second index j. For example, the next topological order vector t is compared to a list of already processed topological order vectors. The determination avoids repeating a computation that has already been performed.

Similar to operation 208, in operation 420, the topological order loss value L is computed for the next topological order vector t by executing operation 300 through 314.

In an operation 422, the second index j is incremented, for example, using j=j+1.

In an operation 424, a determination is made concerning whether $j \leq N_v$. When $j \leq N_v$, processing continues in operation 416 to determine a next topological order vector. When $j > N_v$, processing continues in an operation 426.

In operation 426, the first index i is incremented, for example, using i=i+1.

In an operation 428, a determination is made concerning whether $i \leq (N_v-1)$. When $i \leq (N_v-1)$, processing continues in operation 414 to determine a next topological order vector. When $i > (N_v-1)$, processing continues in an operation 430 shown referring to FIG. 4B. Though not shown, in an alternative embodiment, a number of vectors to determine may be provided as an input value and used to determine how many topological vectors are determined and processed in operations 414 through 428.

Referring to FIG. 4B, in operation 430, the topological order vector t having a minimum value for the topological order loss value $L_{min}$ is identified. For example, a minimum topological order loss value $L_{min}$ of those stored in operation 314 is determined and the associated topological order vector $t_{min}$ is identified.

In an operation 432, a determination is made concerning whether there is another neighbor determination method indicated in operation 402 that has not been processed since a most recent iteration of operation 412. When there is another neighbor determination method to process, processing continues in an operation 440. When there is not another neighbor determination method to process, processing continues in an operation 434.

In operation 434, a determination is made concerning whether $L_{min} \geq L_0$. When $L_{min} \geq L_0$, processing continues in an operation 436. When $L_{min} < L_0$, processing continues in an operation 438.

Similar to operation 216, in operation 436, the initial topological order vector $t_0$ is output or stored, for example, to best topological order vector 126 or another memory location of computer-readable medium 108. For example, when topological order learning application 122 and DAG learning application 722 are integrated, the initial topological order vector $t_0$ may be provided in-memory to DAG learning application 722. In addition, or in the alternative, the initial topological order vector $t_0$ may be presented on display 116, printed by printer 120, stated by speaker 118, etc.

In operation 438, the current topological order vector $t_c$ is defined as the identified topological order vector $t_{min}$, for example, using $t_c = t_{min}$.

In operation 440, a next neighbor determination method of the one or more neighbor determination methods indicated in operation 402 is selected as the neighbor determination method, and processing continues in operation 412 to process the selected neighbor determination method. For example, a next neighbor determination method may be selected from the comma separated list of one or more names or one or more indices.

Figure 5A:
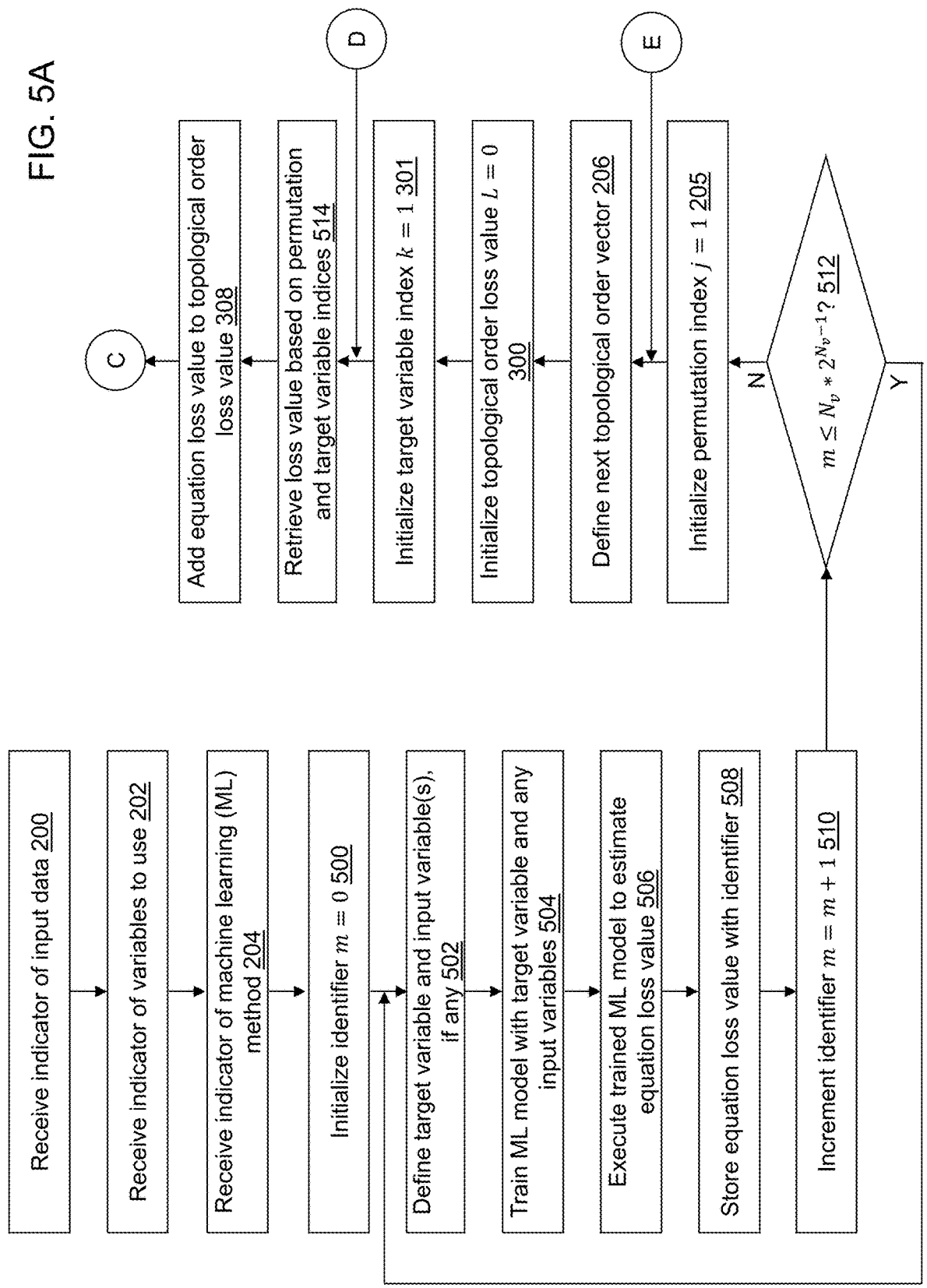
FIGS. 5A and 5B depict a flow diagram illustrating examples of operations performed by a third topological order learning application of the topological order learning device of FIG. 1 in accordance with an illustrative embodiment.
Figure 5B:
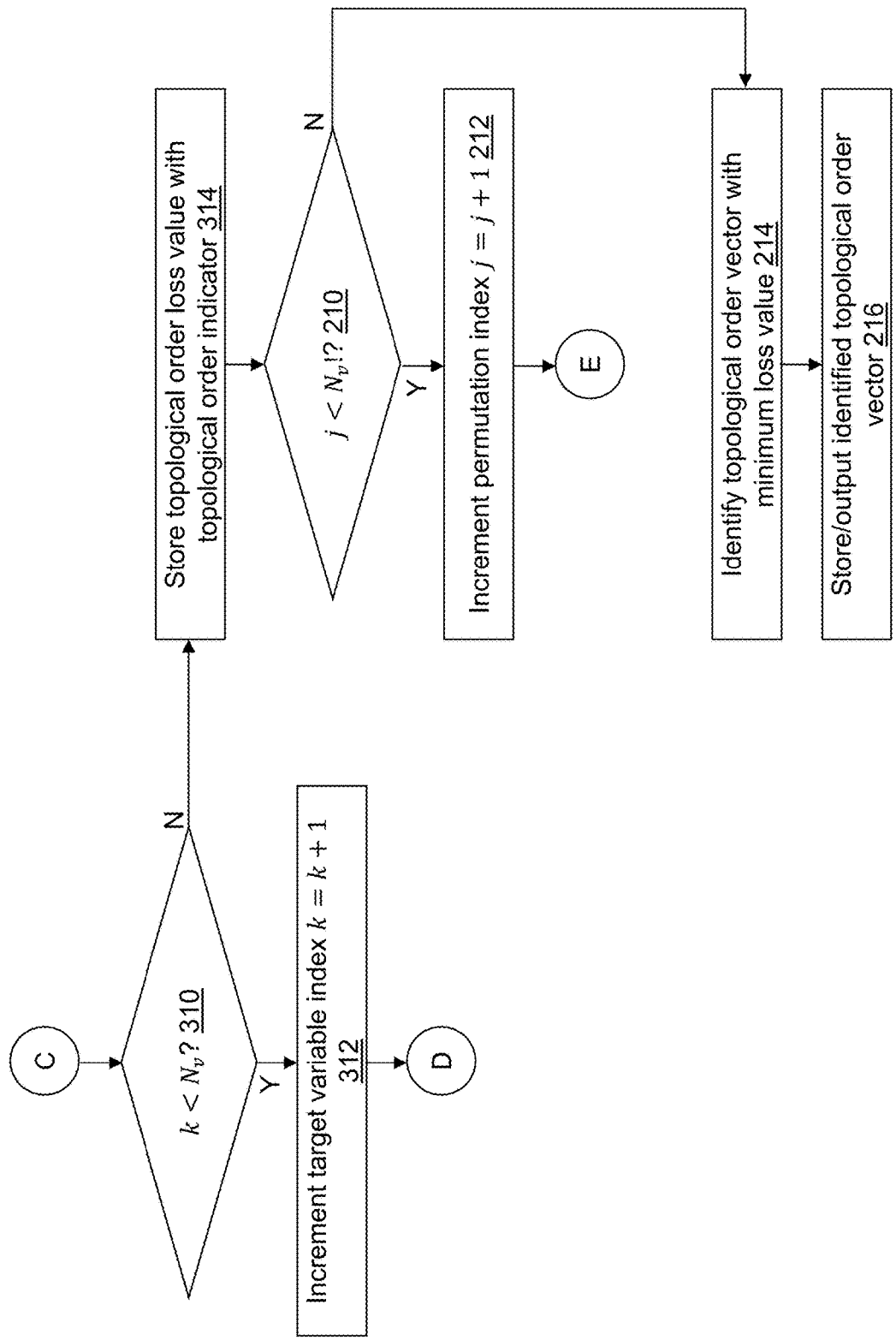

Referring to FIGS. 5A and 5B, an alternative method for determining topological order vector t using topological order learning application 122 is described. The alternative method of FIGS. 5A and 5B assumes that the order of the input variables does not affect the loss value computed for each ML model trained and validated as described in FIG. 2. This assumption reduces the number of ML model trained and validated from $N_v * N_v!$ using the method of FIG. 2 to $N_v + 2^{(N_v-1)}$. Referring to FIG. 5A, operations 200, 202, and 204 are performed.

In an operation 500, an identifier m is initialized, for example, using m=0.

In an operation 502, a target variable and zero or more input variables are defined based on the identifier m. For example, the following pseudocode describes a determination of an equation vector e given the identifier m.

$e = [0, \ldots, 0]$ $q = 2^{(N_v-1)}$ $k = \text{floor}(m/q)$ $r = \text{floor}(m - k*q + 0.5)$ $e[N_v] = k+1$ $jj = 1$ do $ii = 1, N_v - 1$ while $(r > 0)$ if $(\text{mod}(r,2) = 1)$ then if $(ii > k)$ then $e[jj] = ii+1$ else $e[jj] = ii$ $jj = jj + 1$ end $r = (r - \text{mod}(r,2))/2$ end Non-zero entries in the equation vector e indicate an index to an input variable or to the target variable. When only one entry of the equation vector e is greater than zero, the associated non-zero value indicates the index of the target variable, and there are no input variables. Otherwise, each entry of the equation vector e that is greater than zero indicates the index of an input variable with the last entry of the equation vector e having a non-zero value indicating the index of the target variable.

Similar to operation 304, in an operation 504, the ML model is trained using observation vectors included in input data 124 based on the model characteristics and training parameters indicated in operation 204 shown referring to FIG. 5A and using the target variable and any input variables defined in operation 502.

Similar to operation 306, in an operation 506, the model trained in operation 504 is executed with observation vectors included in input data 124 based on the model characteristics and validating/testing parameters indicated in operation 204 shown referring to FIG. 5A and using the target variable and any input variables defined in operation 502 to compute an equation loss value $L_e$ as part of validating/testing the trained model.

In an operation 508, the equation loss value $L_e$ is stored in association with the identifier m. For example, the equation loss value $L_e$ is stored in an array A that has $N_v * 2^{N_v-1}$ entries and is indexed using the identifier m.

In an operation 510, the identifier m is incremented, for example, using m=m+1.

In an operation 512, a determination is made concerning whether $m \leq N_v * 2^{(N_v-1)} - 1$, which indicates that there is at least one additional equation to process. When $m \leq N_v * 2^{(N_v-1)} - 1$, processing continues in operation 502 to determine a next equation loss value to compute for the identifier m. When $m > N_v * 2^{(N_v-1)} - 1$, processing continues in an operation 205 shown referring to FIG. 5A.

Referring to FIG. 5A, operations 205, 206, 300, and 301 are performed.

In an operation 514, the equation loss value previously computed for the permutation index j and the target variable index k is retrieved by sorting the input variables of the next topological order vector t in ascending order to define a sorted topological order vector $t^s$, mapping $t^s$ to the identifier m, and retrieving the equation loss value $L_e$ associated with m and stored in operation 508. For illustration, the pseudocode below maps $t^s$ to the identifier m.

$q = 2^{(N_v-1)}$ $m = (t^s[k] - 1) * q$ do $ii = 1, k-1$ if $(t^s[ii] < t^s[k])$ then $m = m + 2^{t^s[ii]-1}$ else $$m=m+2^{t^x[ii]-2}$$

end end

Referring to FIG. 5A, in operation 308, the equation loss value $L_e$ is added to the topological order loss value L, for example, using L+=$L_e$, and processing continues in operation 310 shown referring to FIG. 5B.

Referring to FIG. 5B, in operation 310, the determination is made concerning whether k<$N_v$. When k<$N_v$, processing continues in operation 312 shown referring to FIG. 5B. When k≥$N_v$, processing continues in operation 314 shown referring to FIG. 5B.

Referring to FIG. 5B, in operation 312, the target variable index k is incremented, for example, using k=k+1, and processing continues in operation 514 shown referring to FIG. 5A.

Referring to FIG. 5B, in operation 314, the topological order loss value L that includes the loss value is stored in association with the indicator of the topological order vector t, and processing continues in operation 210 shown referring to FIG. 5B.

Referring to FIG. 5B, in operation 210, the determination is made concerning whether j<$N_v$!. When j<$N_v$!, processing continues in operation 212 shown referring to FIG. 5B. When j≥$N_v$!, processing continues in operation 214 shown referring to FIG. 5B.

Referring to FIG. 5B, in operation 212, the permutation index j is incremented, for example, using j=j+1, and processing continues in operation 206 shown referring to FIG. 5A.

Referring to FIG. 5B, in operation 214, the topological order vector t having a minimum value for the topological order loss value L, or alternatively a maximum value for topological order loss value L that represents a measure of accuracy, is identified.

Referring to FIG. 5B, in operation 216, the identified topological order vector t is output or stored, for example, to best topological order vector 126 or another memory location of computer-readable medium 108.

Figure 6A:
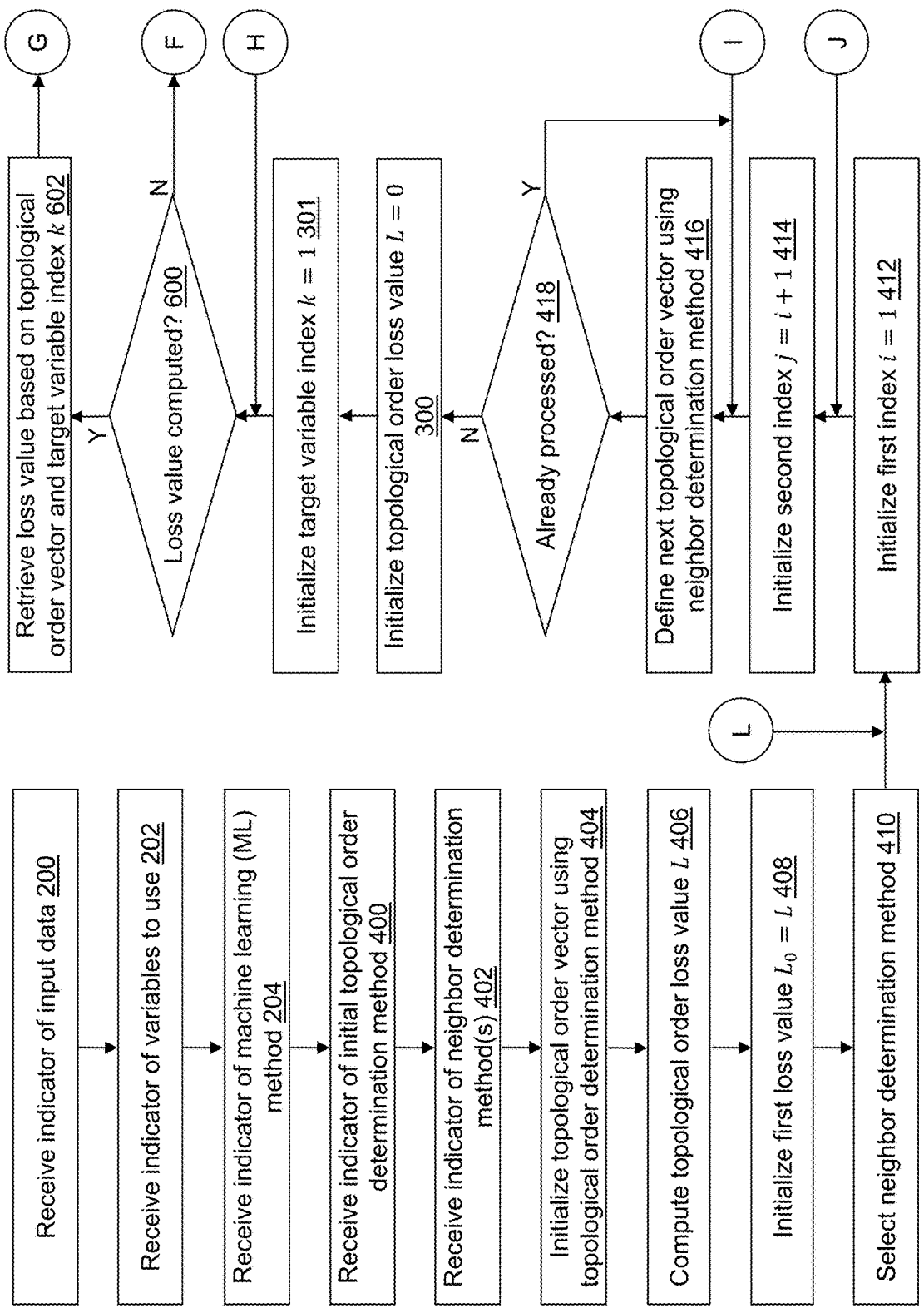
Figure 6C:
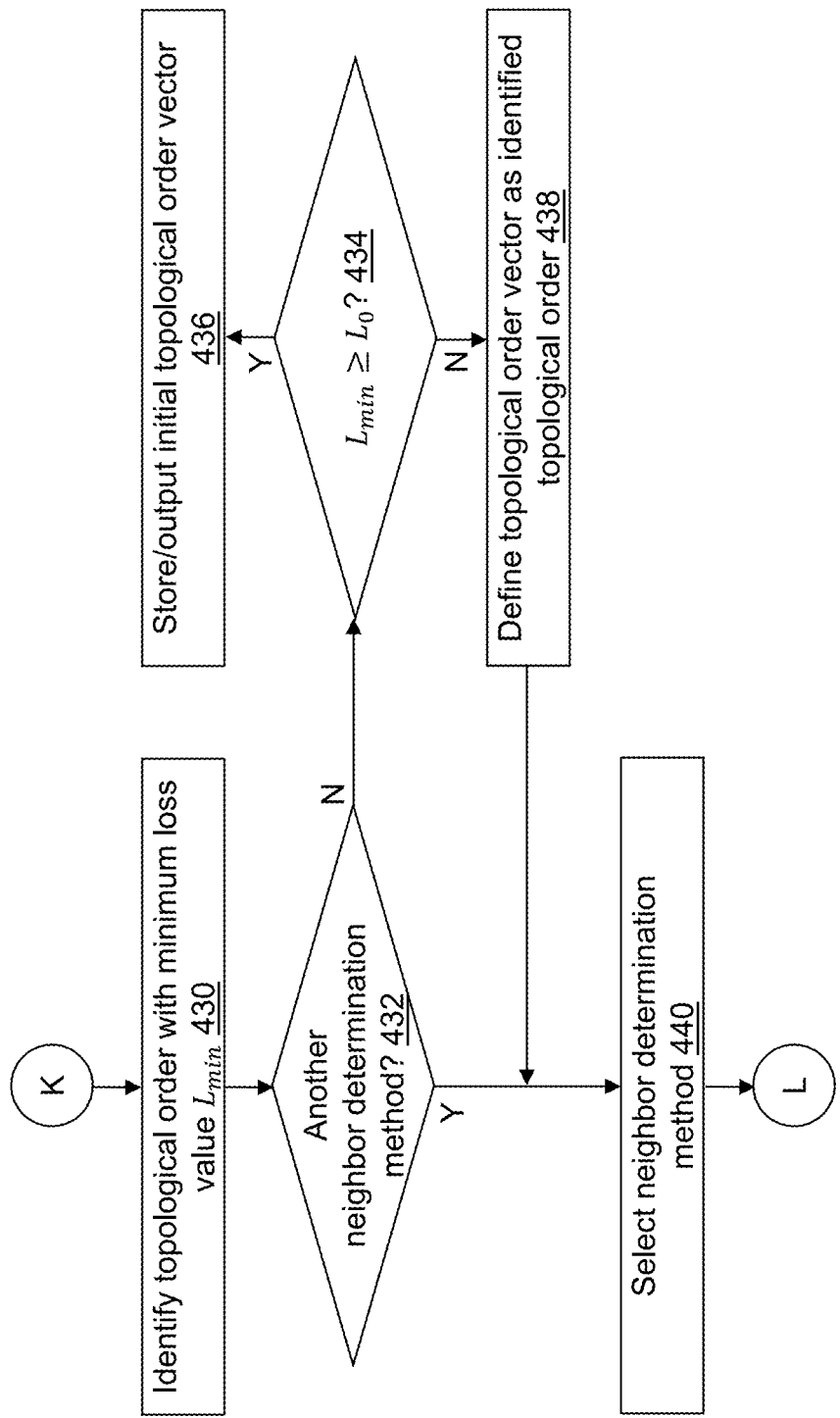

Referring to FIGS. 6A through 6C, an alternative method for determining topological order vector t using topological order learning application 122 is described. The alternative method of FIGS. 6A through 6C assumes that the order of the input variables does not affect the loss value computed for each ML model trained and validated as described in FIGS. 4A and 4B. Referring to FIG. 6A, operations 200, 202, 204, 400, 402, 404, 406, 408, 410, 412, 414, 416, 418, 300, and 301 are performed.

In an operation 600, a determination is made regarding whether the equation loss value $L_e$ has been computed for the equation indicated by the next topological order vector t determined in operation 416 and the target variable index k. When the equation loss value $L_e$ has been computed, processing continues in an operation 602. When the equation loss value $L_e$ has not been computed, processing continues in operation 300 shown referring to FIG. 6B. As an example, the equation loss value $L_e$ is stored in an array A that has $N_v*2^{N_v-1}$ entries in operation 604. The array is indexed using the identifier m that can be computed from the next topological order vector t determined in operation 416 and the target variable index k as described referring to operation 514. The array A may be initialized with all zero values so that a test of A[m]>0 may indicate that the equation loss value $L_e$ has been computed. The pseudocode included in the description of operation 514 above describes mapping the next topological order vector t and the target variable index k to the identifier m.

Referring to FIG. 6A, in operation 602, the equation loss value previously computed for the next topological order vector t and the target variable index k is retrieved by computing the identifier m from the next topological order vector t and the target variable index k and retrieving the value stored in A[m], and processing continues in operation 306 shown referring to FIG. 6B.

Referring to FIG. 6B, operations 302, 304, 306, and 308 are performed.

In an operation 604, the equation loss value $L_e$ is stored, for example, in the array A in association with the identifier m computed from the next topological order vector t and the target variable index k.

Referring to FIG. 6B, in operation 310, the determination is made concerning whether k<$N_v$. When k<$N_v$, processing continues in operation 312 shown referring to FIG. 6B. When k≥$N_v$, processing continues in operation 314 shown referring to FIG. 6B.

Referring to FIG. 6B, in operation 312, the target variable index k is incremented, for example, using k=k+1, and processing continues in operation 600 shown referring to FIG. 6A.

Referring to FIG. 6B, in operation 314, the topological order loss value L is stored in association with the indicator of the topological order vector t, and processing continues in operation 422 shown referring to FIG. 6B.

Referring to FIG. 6B, in operation 422, the second index j is incremented, for example, using j=j+1.

Referring to FIG. 6B, in operation 424, the determination is made concerning whether j≤$N_v$. When j≤$N_v$, processing continues in operation 416 shown referring to FIG. 6A. When j>$N_v$, processing continues in operation 426 shown referring to FIG. 6A.

Referring to FIG. 6B, in operation 426, the first index i is incremented, for example, using i=i+1.

Referring to FIG. 6B, in operation 428, a determination is made concerning whether i≤($N_v$−1). When i≤($N_v$−1), processing continues in operation 414 shown referring to FIG. 6A. When i>($N_v$−1), processing continues in operation 430 shown referring to FIG. 6C.

Referring to FIG. 6C, in operation 430, the topological order vector t having a minimum value for the topological order loss value $L_{min}$ is identified from all of the previous computations in operation 420.

Referring to FIG. 6C, in operation 432, the determination is made concerning whether there is another neighbor determination method indicated in operation 402 that has not been processed since a most recent iteration of operation 412 shown referring to FIG. 6A. When there is another neighbor determination method to process, processing continues in operation 440 shown referring to FIG. 6C. When there is not another neighbor determination method to process, processing continues in operation 434 shown referring to FIG. 6C.

Referring to FIG. 6C, in operation 434, a determination is made concerning whether $L_{min}$≥$L_0$. When $L_{min}$≥$L_0$, processing continues in operation 436 shown referring to FIG. 6C. When $L_{min}$<$L_0$, processing continues in operation 438 shown referring to FIG. 6C.

Referring to FIG. 6C, in operation 436, the initial topological order vector $t_0$ is output or stored, for example, to best topological order vector 126 or another memory location of computer-readable medium 108.

Referring to FIG. 6C, in operation 438, the current topological order vector $t_c$ is defined as the identified topological order vector $t_{min}$, for example, using $t_c=t_{min}$.

Referring to FIG. 6C, in operation 440, the next neighbor determination method of the one or more neighbor determination methods indicated in operation 402 is selected as the neighbor determination method, and processing continues in operation 412 shown referring to FIG. 6A.

Topological order learning application 122 was tested using the operations of FIG. 2 (referred to as Algorithm 1), the operations of FIGS. 4A and 4B (referred to as Algorithm 2), the operations of FIGS. 5A and 5B (referred to as Algorithm 3), and the operations of FIGS. 6A through 6C (referred to as Algorithm 4). In a first experiment, input data 124 included five variables related by a first structural causal model (SCM1)

$$x_5 = \sqrt{2}\,\varepsilon_5$$

$$x_4 = 2\sin(\pi x_5) + \varepsilon_4/\sqrt{2}$$

$$x_1 = \frac{\left(-3 + x_4 x_5 + \cos(\pi x_4) + \sqrt{|x_5|^3}\right)}{2} + \frac{\varepsilon_1}{\sqrt{2}}$$

$$x_3 = 2|1 + x_1 x_4 - \sin(\pi x_5)| + \varepsilon_3/2$$

$$x_2 = \frac{|x_1 x_3| + x_1^2}{4} + \frac{\varepsilon_2}{2}$$

$$\varepsilon_i \sim_{iid} N(0,1),\ i = 1, \ldots, 5$$

The known topological order is {5, 4, 1, 3, 2} because variable 5, $x_5$, does not depend on any other variables; variable 4, $x_4$, depends on variable 5, $x_5$; variable 1, $x_1$, depends on variable 4, $x_4$, and variable 5, $x_5$; variable 3, $x_3$, depends on variable 1, $x_1$, variable 4, $x_4$, and variable 5, $x_5$; and variable 2, $x_2$, depends on variable 1, $x_1$ and variable 3, $x_3$. 10,000 observation vectors were computed using SCM1 and stored in input data 124. The known topological order {5, 4, 1, 3, 2} was identified using all of Algorithms 1 through 4. The computing time requirements are shown in Table 1 below.

TABLE 1

| Algorithm | Time (hours) |
|---|---|
| 1 | 3.5 |
| 2 | 3 |
| 3 | 0.5 |
| 4 | 0.5 |

In a second experiment, input data 124 included 10,000 observation vectors computed using ten variables related by a second structural causal model (SCM2)

$$x_5 = \sqrt{2}\,\varepsilon_5$$

$$x_6 = \sqrt{2}\,\varepsilon_6$$

$$x_7 = \sqrt{2}\,\varepsilon_7$$

$$x_{10} = \sqrt{2}\,\varepsilon_{10}$$

$$x_4 = 2\sin(\pi x_5) + \varepsilon_4/\sqrt{2}$$

$$x_1 = \frac{\left(-3 + x_4 x_5 + \cos(\pi x_4) + \sqrt{|x_5 x_6 x_7|}\right)}{2} + \frac{\varepsilon_1}{\sqrt{2}}$$

-continued $$x_3 = 2|1 + x_1 x_{10} + x_4 x_6 - 2\sin(\pi x_5)| + \varepsilon_3/\sqrt{2}$$

$$x_8 = \left(x_1^2/4 + x_3 x_4 - x_{10}^2/8\right)/3 + \varepsilon_8/2$$

$$x_9 = 2\sqrt{|x_6 x_8|} - 2|x_8| + \varepsilon_9/2$$

$$x_2 = \frac{|x_1 x_3| - |x_1 x_9|}{4} + \frac{\varepsilon_2}{2}$$

$$\varepsilon_i \sim_{iid} N(0,1),\ i = 1, \ldots, 10$$

A known topological order is {5, 6, 7, 10, 4, 1, 3, 8, 9, 2} though multiple topological orders are acceptable. For example, none of variables 5, 6, 7, or 10 depend on another variable. Thus, the order of {6, 7, 10, 5, 4, 1, 3, 8, 9, 2} is equally valid since the variables 5, 6, 7, and 10 can be in any order in the first four positions of the topological order. Variable 5, $x_5$, should come before any of the remaining variables. Variable 4, $x_4$, should come before any of the remaining variables and after Variable 5, $x_5$. Variable 1, $x_1$, should come before any of the remaining variables and after Variables $x_4$, $x_5$, $x_6$, and $x_7$. Variable 10, $x_{10}$, should come before any of the remaining variables $x_3$, $x_8$, $x_9$, and $x_2$. Variable 3, $x_3$, should come before any of the remaining variables $x_8$, $x_9$, and $x_2$. Variable 8, $x_8$, should come before any of the remaining variables $x_9$ and $x_2$. Variable 9, $x_9$, should come before the remaining variable $x_2$.

A topological order computed using Algorithm 1 with SCM2 was not possible because the estimated computing time was 24 years. Using Algorithm 2, a correct topological order of {5, 6, 7, 4, 1, 10, 3, 8, 9, 2} was computed. Using Algorithm 3, a correct topological order of {6, 5, 4, 7, 1, 10, 3, 8, 9, 2} was computed using the Swap neighbor determination method. Using Algorithm 4, a correct topological order of {6, 5, 4, 7, 1, 10, 3, 8, 9, 2} was computed in 999 trials and a correct topological order of {5, 6, 4, 7, 1, 10, 3, 8, 9, 2} was computed in one trial. The computing time requirements are shown in Table 2 below for SCM2.

TABLE 2

| Algorithm | Time (hours) |
|---|---|
| 1 | N/A |
| 2 | 69 |
| 3 | 30 |
| 4 | 6.6 |

A single 25-CPU computer was used to execute all of the algorithms for both SCM1 and SCM2.

Algorithms 3 and 4 assume that the order of the input variables does not matter. Though this is typically a reasonable assumption, it is not always correct. For example, a computing precision of the residuals of regressing {$x_1$, $x_3$} on $x_2$ is different from residuals of regressing {$x_3$, $x_1$} on $x_2$ when the machine learning model is a deep neural network model. The correct result may nevertheless typically be computed because the difference introduced by different orders of input variables is not significant.

Figure 7:
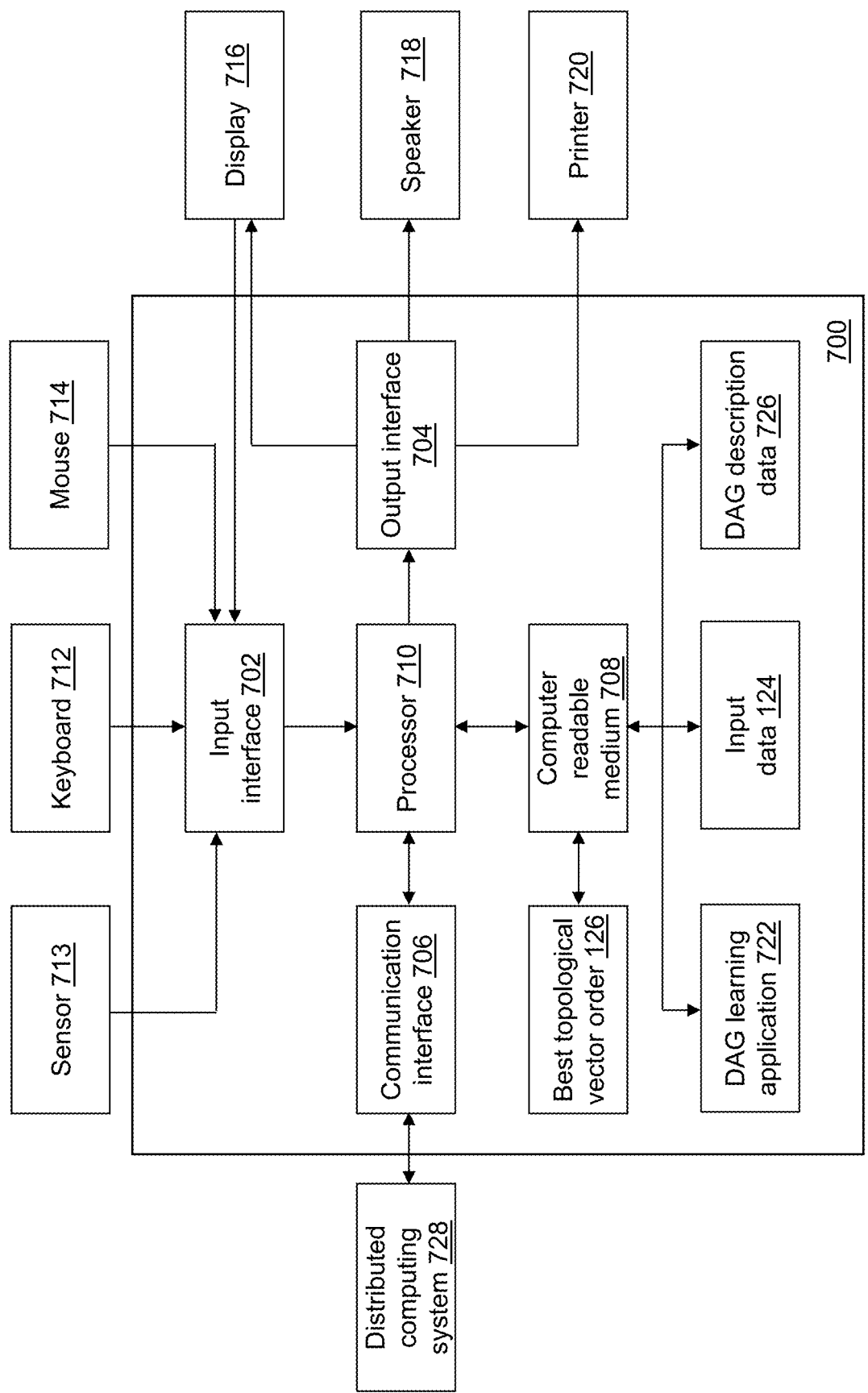
FIG. 7 depicts a block diagram of a directed acyclic graph (DAG) learning device in accordance with an illustrative embodiment.

Referring to FIG. 7, a block diagram of a DAG learning device 700 is shown in accordance with an illustrative embodiment. DAG learning device 700 may include a second input interface 702, a second output interface 704, a second communication interface 706, a second non-transitory computer-readable medium 708, a second processor 710, input data 124, best topological order vector 126, DAG learning application 722, and DAG description data 726. DAG learning application 722 learns a DAG from observations stored in input data 124 using the best topological order vector stored in best topological order vector 126 or otherwise provided to DAG learning application 722. Fewer, different, and/or additional components may be incorporated into DAG learning device 700.

Second input interface 702 provides the same or similar functionality as that described with reference to input interface 102 of topological order learning device 100 though referring to DAG learning device 700. Second output interface 704 provides the same or similar functionality as that described with reference to output interface 104 of topological order learning device 100 though referring to DAG learning device 700. Second communication interface 706 provides the same or similar functionality as that described with reference to communication interface 106 of topological order learning device 100 though referring to DAG learning device 700. Data and messages may be transferred between DAG learning device 700 and a second distributed computing system 328 using third communication interface 706. Distributed computing system 728 and second distributed computing system 128 may be the same or different computing systems. Second computer-readable medium 708 provides the same or similar functionality as that described with reference to computer-readable medium 108 of topological order learning device 100 though referring to DAG learning device 700. Second processor 710 provides the same or similar functionality as that described with reference to processor 110 of topological order learning device 100 though referring to DAG learning device 700.

DAG learning application 722 may perform operations associated with learning a DAG to describe parent-child relationships between variables in input data 124. Some or all of the operations described herein may be embodied in DAG learning application 722. The operations may be implemented using hardware, firmware, software, or any combination of these methods.

Referring to the example embodiment of FIG. 7, DAG learning application 722 is implemented in software (comprised of computer-readable and/or computer-executable instructions) stored in second computer-readable medium 708 and accessible by second processor 710 for execution of the instructions that embody the operations of DAG learning application 722. DAG learning application 722 may be written using one or more programming languages, assembly languages, scripting languages, etc. DAG learning application 722 may be integrated with other analytic tools. As an example, DAG learning application 722 may be part of an integrated data analytics software application and/or software architecture such as that offered by SAS Institute Inc. of Cary, North Carolina, USA. DAG learning application 722 may be implemented as a Web application.

Referring to FIGS. 9A, 9B, 10A, and 10B, example operations associated with DAG learning application 722 are described. Additional, fewer, or different operations may be performed depending on the embodiment of DAG learning application 722. For example, FIGS. 9A, 9B, 10A, and 10B describe two different processes that learn a DAG.

The order of presentation of the operations of FIGS. 9A, 9B, 10A, and 10B is not intended to be limiting. Some of the operations may not be performed in some embodiments. Although some of the operational flows are presented in sequence, the various operations may be performed in various repetitions and/or in other orders than those that are illustrated. For example, a user may execute DAG learning application 722, which causes presentation of a first user interface window, which may include a plurality of menus and selectors such as drop-down menus, buttons, text boxes, hyperlinks, etc. associated with DAG learning application 722 as understood by a person of skill in the art. The plurality of menus and selectors may be accessed in various orders. Some of the operational flows further may be performed in parallel, for example, using a plurality of threads and/or a plurality of computing devices such as may be included in distributed computing system 728.

Figure 9A:
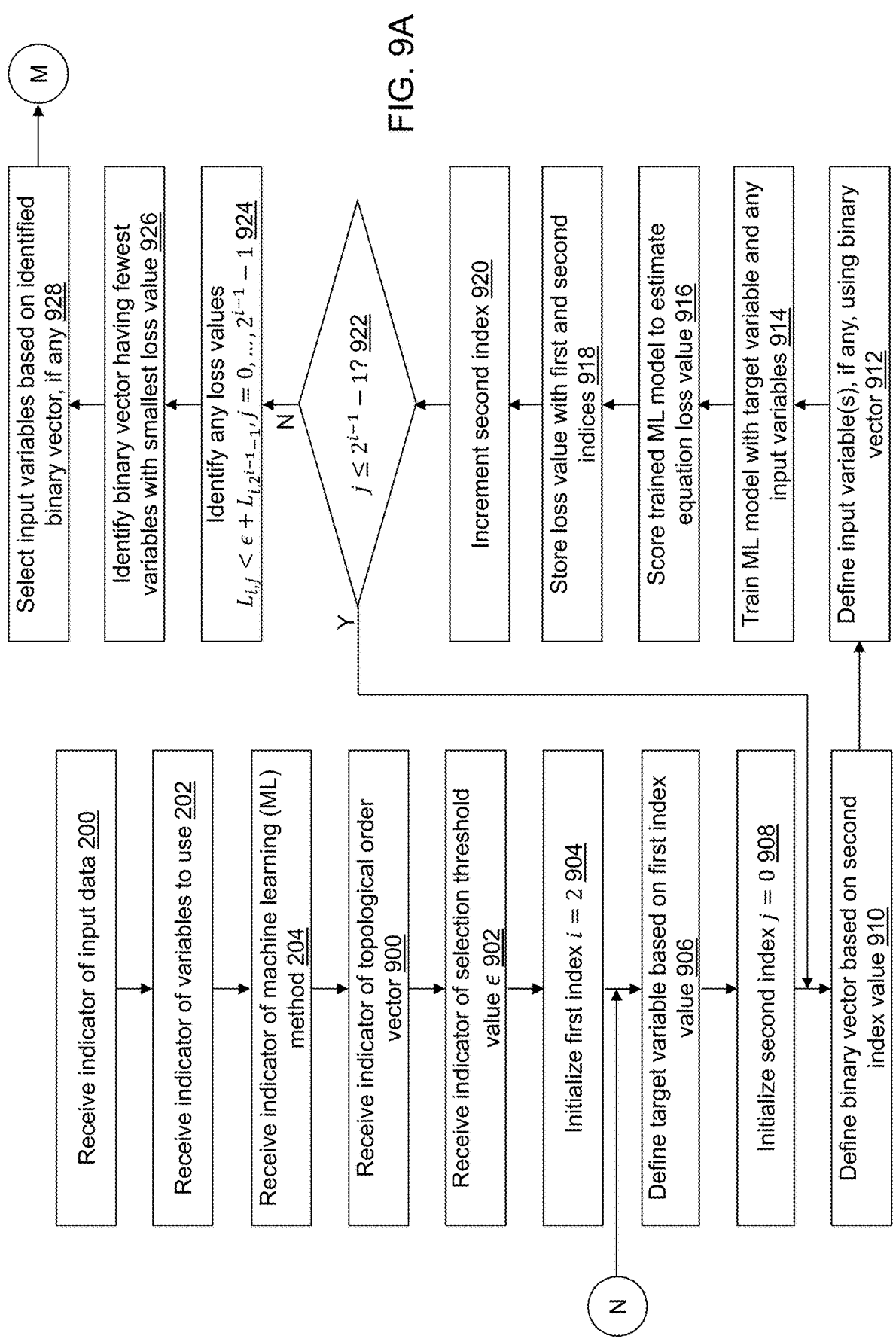
FIGS. 9A and 9B depict a flow diagram illustrating examples of operations performed by a first DAG learning application of the DAG learning device of FIG. 7 in accordance with an illustrative embodiment.

Referring to FIG. 9A, operations 200, 202, and 204 are performed.

In an operation 900, a sixth indicator may be received that indicates the best topological order vector t for the plurality of variables. As an example, the sixth indicator may be received by topological order learning application 122 after selection from a user interface window or after entry by a user into a user interface window. For example, the sixth indicator may indicate a location and a name of best topological order vector 126. As another example, the sixth indicator may include the best topological order vector t. In an alternative embodiment, the best topological order vector t may not be selectable. For example, a most recently defined best topological order vector t from topological order learning application 122 may be used automatically.

In an operation 902, a seventh indicator of a selection threshold value e may be received. In an alternative embodiment, the seventh indicator may not be received. For example, a default value may be stored, for example, in second computer-readable medium 708 and used automatically. In another alternative embodiment, the value of the selection threshold value $\in$ may not be selectable. Instead, a fixed, predefined value may be used. For illustration, a default value of the selection threshold value $\in$ may be $\in = 0.01$ though other values may be used.

In an operation 904, a first index i is initialized, for example, using i=2.

In an operation 906, a target variable is defined based on the best topological order vector t and the first index i. For example, the target variable is defined as the variable indicated by the $i^{th}$ entry of the best topological order vector t.

In an operation 908, a second index j is initialized, for example, using j=0.

In an operation 910, a binary vector b is defined based on the best topological order vector t and the second index j. For example, the binary vector b is defined as b=BinaryFormat (j) such that b is the unique set $\{b_1, \ldots, b_{i-1}\}$ that is a solution of $$j = \sum_{k=1}^{i-1} b_k * 2^{k-1},$$

where $\{b_1, \ldots, b_{i-1}\} = 0$ or 1.

In an operation 912, zero or more input variables are defined based on the best topological order vector t and the defined binary vector b. When a value of any member of the defined binary vector b equals one, the variable indicated by the corresponding index location in the best topological order vector t is included as an input variable; otherwise, the variable indicated by the corresponding index location in the best topological order vector t is not included as an input variable. For example, for j=0 and i=2, b=$\{b_1\}$=0, and there are no input variables. For example, for j=5 and i=4, b=$\{b_1, b_2, b_3\}$=$\{1,0,1\}$, and the variables indicated by the first position and the third positions of the best topological order vector t are input variables, but the variable indicated by the second position of the best topological order vector t is not an input variable.

Similar to operation 304, in an operation 914, the ML model is trained using observation vectors included in input data 124 based on the model characteristics and training parameters indicated in operation 204 shown referring to FIG. 9A and using the target variable defined in operation 906 and any input variables defined in operation 912.

Similar to operation 306, in an operation 916, the model trained in operation 914 is executed with observation vectors included in input data 124 based on the model characteristics and validating/testing parameters indicated in operation 204 shown referring to FIG. 9A and using the target variable defined in operation 906 and any input variables defined in operation 912 to compute an equation loss value $L_e$ as part of scoring the trained model.

In an operation 918, the equation loss value $L_e$ is stored in association with the first and second indices i and j and optionally the binary vector b. When topological order learning application 122 is integrated with DAG learning application 722, the equation loss value $L_e$ may have already been determined. In this case, operations 914 through 918 may be replaced with a retrieval process that retrieves the equation loss value $L_e$ using indices stored with each equation loss value $L_e$.

In an operation 920, the second index j is incremented, for example, using j=j+1.

In an operation 922, a determination is made concerning whether $j \leq 2^{(i-1)}-1$, which indicates that there is at least one additional equation to process. When $j \leq 2^{(i-1)}-1$, processing continues in operation 910 to determine a next equation loss value. When $j > 2^{(i-1)}-1$, processing continues in an operation 924.

For illustration, Table 1 below illustrates a progression of operations 910 through 922 for $N_v=5$, the best topological order vector t={5,1,4,3,2}, and i=4. The target variable is $x_3$ because 3 is the fourth entry in the best topological order vector t and 3 indicates the third input variable identified in input data 124. The input variables are $x_5$, $x_1$, and $x_4$ because 5, 1, and 4 are the first through third entries in the best topological order vector t.

TABLE 1

| j | b | Input variables | $L_e$ |
|---|---|---|---|
| 0 | 000 | { } | $L_{e,4,0}$ |
| 1 | 001 | {$x_5$} | $L_{e,4,1}$ |
| 2 | 010 | {$x_1$} | $L_{e,4,2}$ |
| 3 | 011 | {$x_1$, $x_5$} | $L_{e,4,3}$ |
| 4 | 100 | {$x_4$} | $L_{e,4,4}$ |
| 5 | 101 | {$x_4$, $x_5$} | $L_{e,4,5}$ |
| 6 | 110 | {$x_4$, $x_1$} | $L_{e,4,6}$ |
| 7 | 111 | {$x_4$, $x_1$, $x_5$} | $L_{e,4,7}$ |

In an operation 924, any loss values computed in operations 910 through 922 are identified for which $L_{e,i,j} < \epsilon + L_{e,i,2^{(i-1)}-1}$, where j=0, ..., $2^{(i-1)}-1$. For example, each value of j for which $L_{e,i,j} < \epsilon + L_{e,i,2^{(i-1)}-1}$ may be identified. The loss value indicated by $L_{e,i,2^{(i-1)}-1}$ results when all of the variables are selected as input variables for the target variable defined based on the best topological order vector t and the first index i in operation 906.

In an operation 926, the binary vector b defined from each j as described in operation 910 that has a fewest number of input variables may be identified from among the values of j identified in operation 924 if any were identified. For example, the number of input variables is the number of ones included in each respective binary vector b defined for each value of j identified in operation 924. When more than one binary vector b defined from the values of j identified in operation 924 has the same minimum number of variables, the value of j identified in operation 924 that has a minimum loss value $L_{e,i,j}$ is identified with its associated binary vector b.

In an operation 928, the input variables associated with the binary vector b identified in operation 926 are selected and stored in association with the first index i to indicate the parent variables for the target variable defined in operation 906. No binary vector b may be identified in operation 926 indicating that the target variable defined in operation 906 has no parent variables. Processing continues in an operation 930 shown referring to FIG. 9B.

In operation 930, the input variables, if any, are stored in association with the first index i.

In an operation 932, the first index i is incremented, for example, using i=i+1.

In an operation 934, a determination is made concerning whether $i \leq N_v-1$, which indicates that there is at least one additional target variable to process. When $i \leq N_v-1$, processing continues in operation 906 to determine and process a next target variable. When $i > N_v-1$, processing continues in an operation 936.

In an operation 936, a DAG description is created based on the parent variable(s) of each variable included in the best topological order vector t that were defined based on the input variables, if any, stored in association with the first index i in operation 930. The first variable indicated in the best topological order vector t necessarily has no parent. The DAG description may be created using an adjacency matrix W by putting a one in a column and a row position of the adjacency matrix W when the variable indicated by the column has the variable associated with the row as a parent. For example, an adjacency matrix W may be defined below based on the input variables defined for each variable indicated by successive columns.

| Variable | X1 | X2 | X3 | X4 | X5 | X6 | X7 |
|---|---|---|---|---|---|---|---|
| X1 | 0 | 1 | 0 | 0 | 0 | 0 | 0 |
| X2 | 0 | 0 | 0 | 1 | 1 | 0 | 0 |
| X3 | 0 | 1 | 0 | 1 | 0 | 1 | 0 |
| X4 | 0 | 0 | 0 | 0 | 0 | 1 | 0 |
| X5 | 0 | 0 | 0 | 0 | 0 | 0 | 0 |
| X6 | 0 | 0 | 0 | 0 | 1 | 0 | 1 |
| X7 | 0 | 0 | 0 | 0 | 0 | 0 | 0 |

Variable X1 and variable X3 have no parents because there is no "1" in either the first column or the third column. Variable X6 is the only parent of variable X7 because the only "1" in the seventh column is in the sixth row. Variables X1 and X3 are parents of variable X2 because there is a "1" in the second column in the first and third rows. Variables X2 and X3 are parents of variable X4 because there is a "1" in the fourth column in the second and third rows. Variables X2 and X6 are parents of variable X5 because there is a "1" in the fifth column in the second and sixth rows. Variables X3 and X4 are parents of variable X6 because there is a "1" in the sixth column in the third and fourth rows. Based on these relationships, a DAG representation can be presented graphically. Again, a specific input variable in input data 124 is associated with each of X1, X2, X3, X4, X5, X6, and X7.

In an operation 938, a description of the DAG is output. For example, the adjacency matrix W may be output to DAG description data 726. Additional, information may further be output.

Figure 10A:
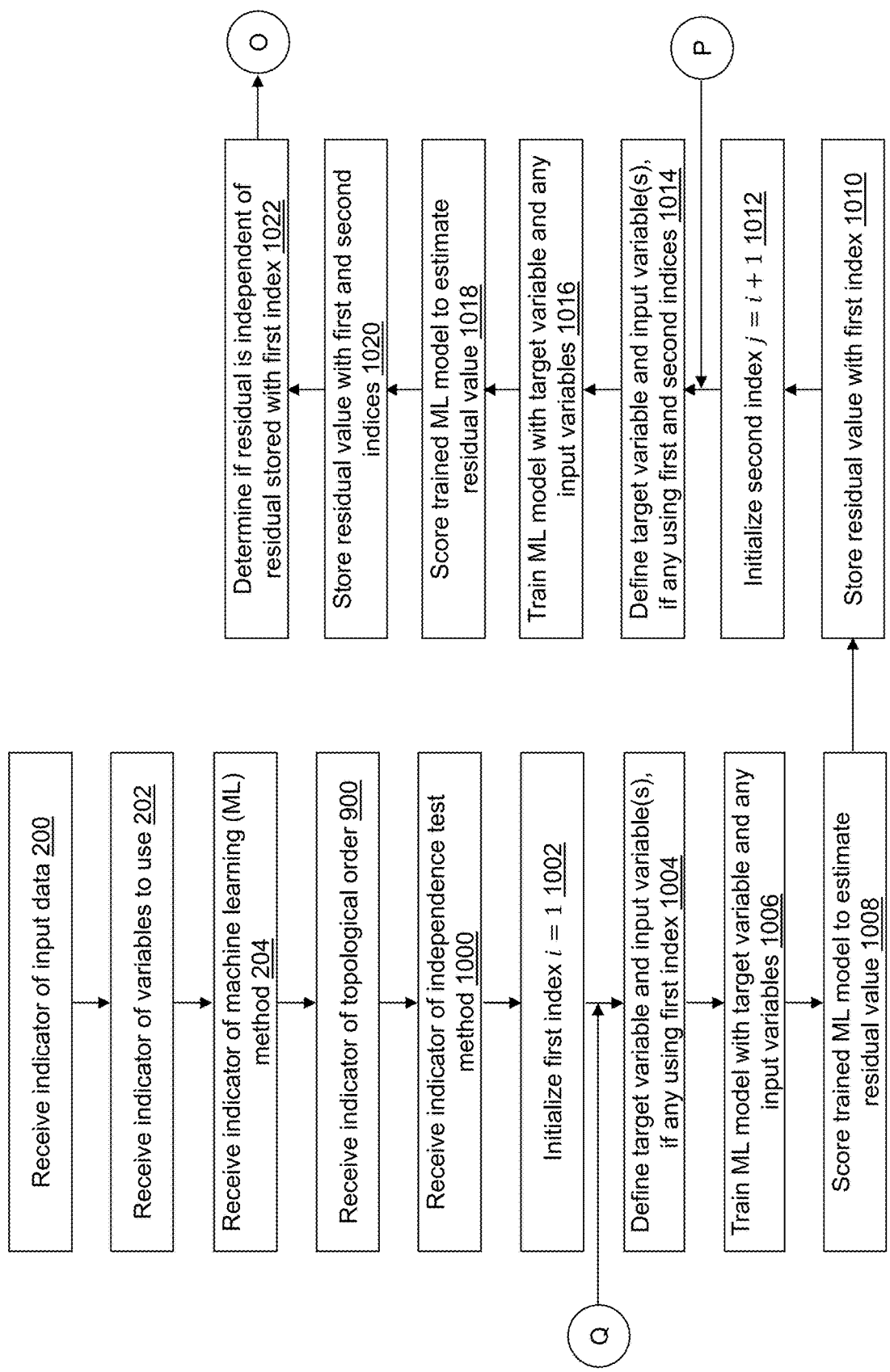
FIGS. 10A and 10B depict a flow diagram illustrating examples of operations performed by a second DAG learning application of the DAG learning device of FIG. 7 in accordance with an illustrative embodiment.
Figure 10B:
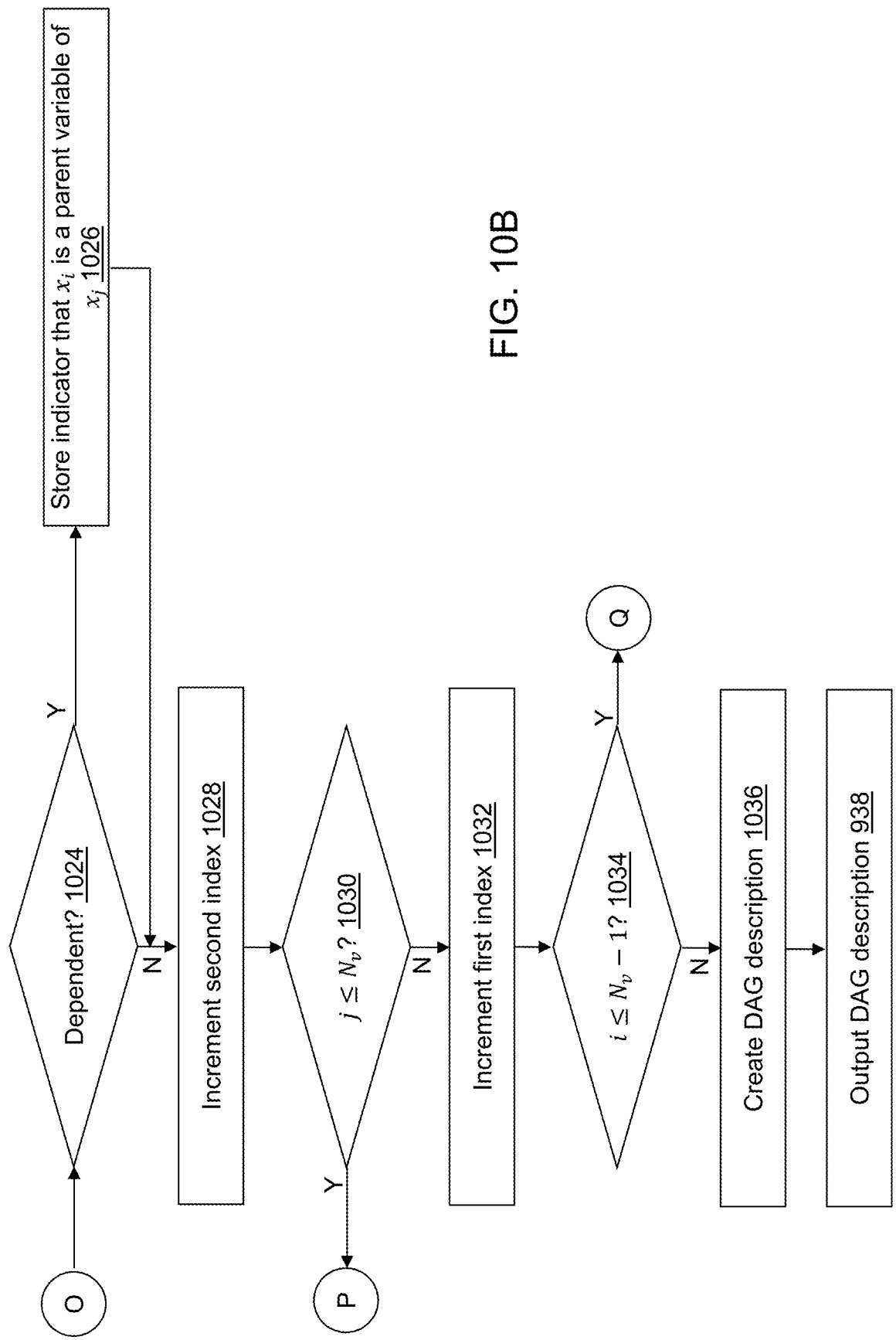

Referring to FIGS. 10A and 10B, an alternative method for learning a DAG using DAG learning application 722 is described. Referring to FIG. 10A, operations 200, 202, 204, and 900 are performed.

In an operation 1000, an eighth indicator may be received that indicates an independence test method that determines a dependency relationship between variables. For example, the eighth indicator indicates a name of an independence test method and parameters associated with executing the independence test method. The eighth indicator may be received by DAG learning application 722 from a user interface window or after entry by a user into a user interface window. A default value for the model may further be stored, for example, in second computer-readable medium 708. As an example, a model type may be selected from "Canova", "Pearson's Rho", etc. The independence test method indicated by "Canova" may refer to a Canova independence test method. For illustration, the Canova independence test method is described in a paper by Yi Wang, et al., titled *Efficient test for nonlinear dependence of two continuous variables* published in BMC bioinformatics, volume 16 at pages 1-8 (2015). The independence test method indicated by "Pearson's Rho" may refer to a Pearson's correlation coefficient independence test method. Of course, the independence test method may be labeled or selected in a variety of different manners by the user as understood by a person of skill in the art. In an alternative embodiment, the independence test method may not be selectable, and a single independence test method is implemented by DAG learning application 722. For example, the Canova independence test method may be used by default or without allowing a selection. The eighth indicator may further indicate one or more parameters to when the independence test method is executed and may vary based on the independence test method indicated.

In an operation 1002, a first index i is initialized, for example, using i=1.

Similar to operation 302, in an operation 1004, a target variable and zero or more input variables are defined based on the best topological order vector t and the first index i. For example, the target variable is defined as the variable indicated by the $i^{th}$ entry of the best topological order vector t. Any input variables are defined as preceding entries of the best topological order vector t in the order defined from l=1, . . . , i−1.

Similar to operation 304, in an operation 1006, the ML model is trained using observation vectors included in input data 124 based on the model characteristics and training parameters indicated in operation 204 shown referring to FIG. 10A and using the target variable and any input variables defined in operation 1004.

Similar to operation 306, in an operation 1008, the model trained in operation 1006 is executed with observation vectors included in input data 124 based on the model characteristics and validating parameters indicated in operation 204 shown referring to FIG. 10A and using the target variable and any input variables defined in operation 1004 to compute a first residual value $r_k^1 = y_k - \hat{y}_k$ for each observation vector k=1, . . . , N that is a difference between the actual target variable value $y_k$ and the target variable value $\hat{y}_k$ predicted by executing the trained model in operation 1008.

In an operation 1010, a first residual vector $r^1 = [r_1^1, \ldots, r_N^1]$ is stored in association with the first index i.

In an operation 1012, a second index j is initialized, for example, using j=i+1.

Similar to operation 302, in an operation 1014, a target variable and one or more input variables are defined based on the best topological order vector t, the first index i, and the second index j. For example, the target variable is defined as the variable indicated by the $j^{th}$ entry of the best topological order vector t. Any input variables are defined as preceding entries of the best topological order vector t in the order defined from l=1, . . . , j−1.

Similar to operation 304, in an operation 1016, the ML model is trained using observation vectors included in input data 124 based on the model characteristics and training parameters indicated in operation 204 shown referring to FIG. 10A and using the target variable and any input variables defined in operation 1014.

Similar to operation 306, in an operation 1018, the model trained in operation 1001 is executed with observation vectors included in input data 124 based on the model characteristics and validating parameters indicated in operation 204 shown referring to FIG. 10A and using the target variable and any input variables defined in operation 1014 to compute a second residual value $r_k^2 = y_k - \hat{y}_k$ for each observation vector k=1, . . . , N that is a difference between the actual target variable value $y_k$ and the target variable value $\hat{y}_k$ predicted by executing the trained model in operation 1018.

In an operation 1020, a second residual vector $r^2 = [r_1^2, \ldots, r_N^2]$ is stored in association with the first index i and the second index j.

In an operation 1022, whether the second residual vector $r^2$ is independent of the first residual vector $r^1$ is determined using the independence test method indicated in operation 1000 with the second residual vector $r^2$ and the first residual vector $r^1$ as input vectors. Processing continues in an operation 1024 shown referring to FIG. 10B.

In operation 1024, when the second residual vector $r^2$ is determined to be dependent on the first residual vector $r^1$ in operation 1022, the variable indicated by $x_i$ is a parent variable of the variable indicated by xx, and processing continues in an operation 1026. When the second residual vector $r^2$ is determined to be independent of the first residual vector $r^1$ in operation 1022, the variable indicated by $x_i$ is not a parent variable of the variable indicated by $x_j$, and processing continues in an operation 1028. Whether the second residual vector $r^2$ is dependent on the first residual vector $r^1$ is used to indicate that $x_i$ is a parent variable because second residual vector $r^2$ cannot be explained without the presence of the first residual vector $r^1$.

In operation 1026, an indicator the variable indicated by $x_i$ is a parent variable of the variable indicated by $x_j$ is stored.

In operation 1028, the second index j is incremented, for example, using j=j+1.

In an operation 1030, a determination is made concerning whether $j \leq N_v$, which indicates that there is at least one additional variable to process. When $j \leq N_v$, processing continues in operation 1014 of FIG. 10A to determine whether a next variable is independent. When $j > N_v$, processing continues in an operation 1032.

In operation 1032, the first index i is incremented, for example, using i=i+1.

In an operation 1034, a determination is made concerning whether $i \leq N_v - 1$, which indicates that there is at least one additional variable to process. When $i \leq N_v - 1$, processing continues in operation 1004 of FIG. 10A to evaluate next variable combinations. When $i > N_v - 1$, processing continues in an operation 1036.

Similar to operation 936, in operation 1036, a DAG description is created based on the parent variable(s) of each variable included in the best topological order vector t that were stored in operation 1026, if any.

Operation 938 is performed to output the DAG description.

Figure 9B:
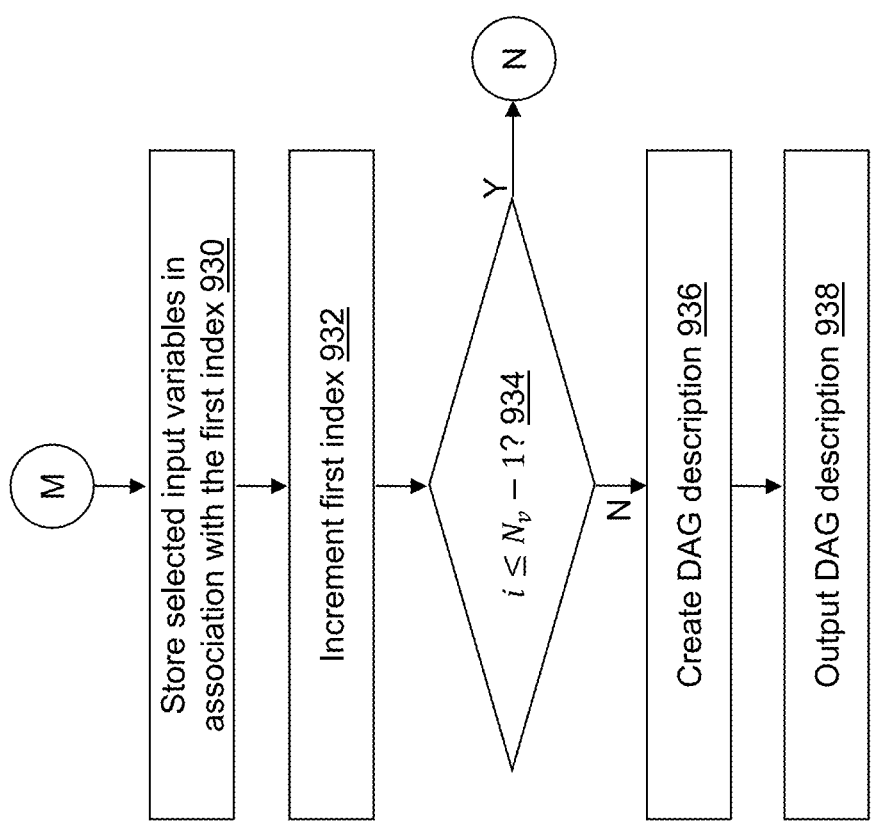
Figure 11A:
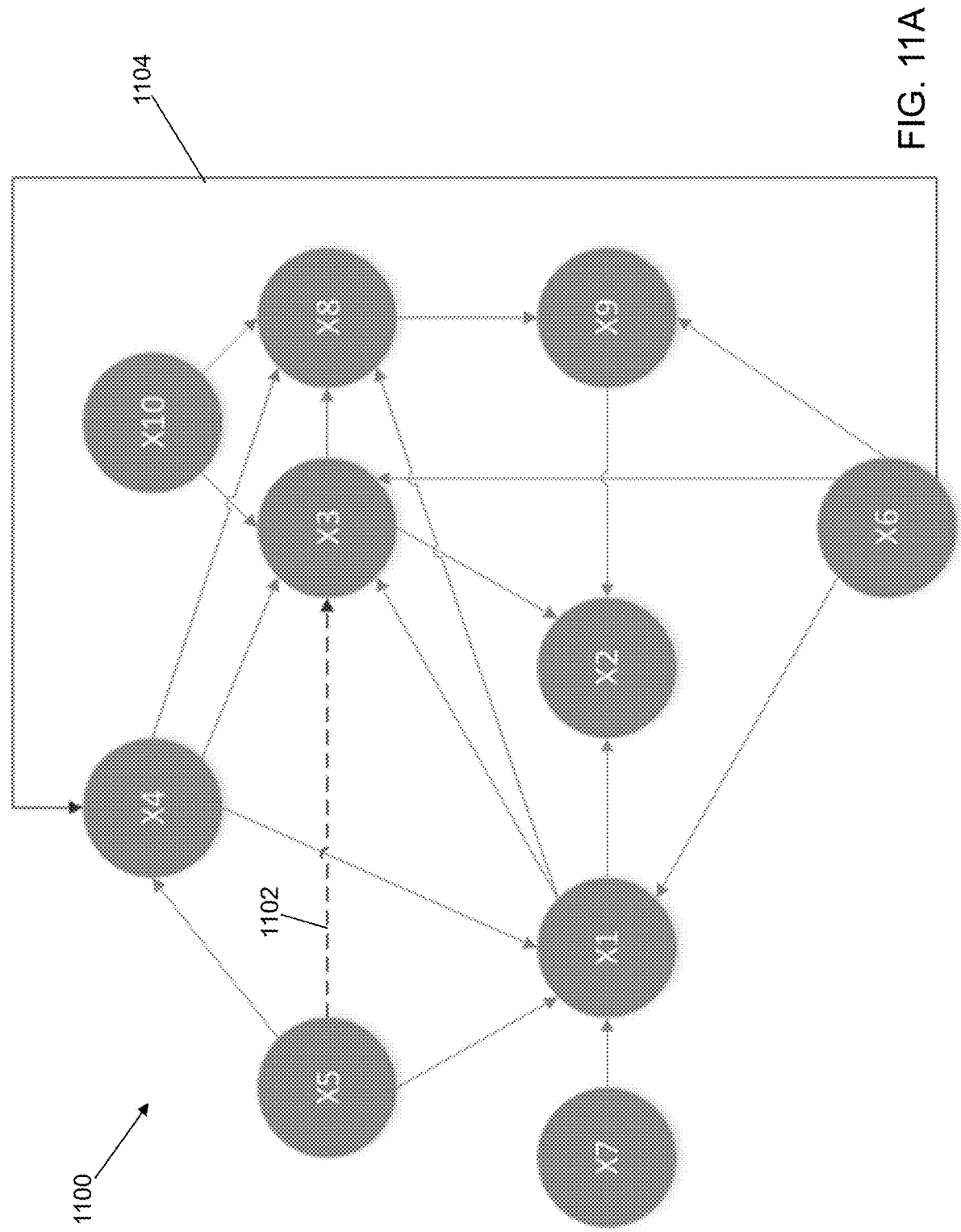
FIG. 11A shows a DAG determined using the operations of FIGS. 9A and 9B with a first selection threshold in accordance with an illustrative embodiment.

Referring to FIG. 11A, a first DAG 1100 is shown graphically that was determined using the operations of FIGS. 9A and 9B with the selection threshold value ε=0.01 and with a first 10 variable dataset in accordance with an illustrative embodiment. Relative to the known DAG, first DAG 1100 incorrectly does not include a first missing edge 1102 from variable X5 to variable X3 and includes a first additional edge 1104 from variable X6 to variable X4. As a result, the structural Hamming distance (SHD) that is a sum of the number of extra edges, the number of missing edges, and the number of reversed edges is two for first DAG 1100.

Figure 11B:
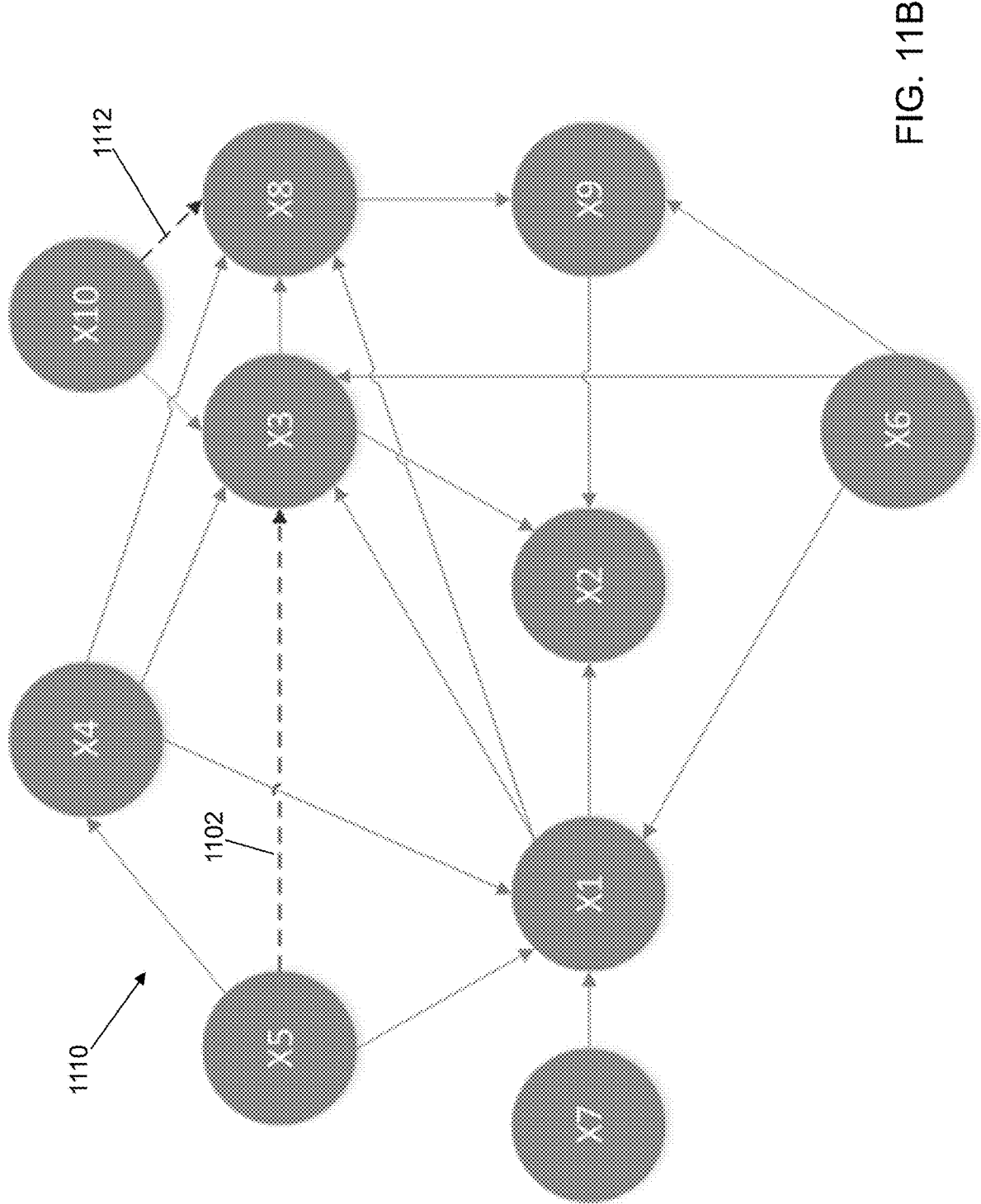
FIG. 11B shows a DAG determined using the operations of FIGS. 9A and 9B with a second selection threshold in accordance with an illustrative embodiment.

Referring to FIG. 11B, a second DAG 1110 is shown graphically that was determined using the operations of FIGS. 9A and 9B with the selection threshold value ε=0.02 and with the first 10 variable dataset in accordance with an illustrative embodiment. Relative to the known DAG, second DAG 1110 incorrectly does not include first missing edge 1102 from variable X5 to variable X3 and incorrectly does not include a second missing edge 1112 from variable X10 to variable X8. As a result, the SHD is also two for second DAG 1110.

Referring to FIG. 11C, a third DAG 1120 is shown graphically that was determined using the operations of FIGS. 10A and 10B with the first 10 variable dataset in accordance with an illustrative embodiment. Relative to the known DAG, third DAG 1120 includes a second additional edge 1122 from variable X10 to variable X2, a third additional edge 1124 from variable X8 to variable X2, a fourth additional edge 1126 from variable X1 to variable X9, and a fifth additional edge 1128 from variable X7 to variable X8. As a result, the SHD is four for third DAG 1120

Though the SHD was worse using the operations of FIGS. 10A and 10B as compared to the operations of FIGS. 9A and 9B, the operations of FIGS. 10A and 10B are polynomial with the number of variables; whereas, the operations of FIGS. 9A and 9B are exponential meaning the operations of FIGS. 9A and 9B require significantly more computer processing time than those of the operations of FIGS. 10A and 10B as the number of variables increases.

By using the algorithm introduced in U.S. Pat. No. 11,443,198 titled Directed Acyclic Graph Machine Learning System and assuming that there are linear causal relationships between variables, the algorithm only needs one or two seconds, but the estimated DAG is far away from the truth meaning that the estimated topological order is wrong. The SHD of the estimated DAG is 32 for the hyperparameter significance level setting as 0.01, 20 for the hyperparameter significance level setting as 0.001, and 32 for the hyperparameter significance level setting as 0.0001. That is, the SHD using the algorithm described in U.S. Pat. No. 11,443,198 is at least one magnitude worse than the SHD obtained using topological order learning application 122 and DAG learning application 722.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) define a target variable and zero or more input variables from a plurality of variables based on an identifier;
   (B) train a machine learning model with a plurality of observation vectors using the defined target variable and the zero or more input variables, wherein each observation vector of the plurality of observation vectors includes a variable value for each variable of the plurality of variables;
   (C) execute the trained machine learning model with a second plurality of observation vectors using the defined target variable and the zero or more input variables to compute an equation loss value, wherein each observation vector of the second plurality of observation vectors includes the variable value for each variable of the plurality of variables;
   (D) store the computed equation loss value in association with the identifier;
   (E) increment the identifier;
   (F) repeat (B) through (E) a plurality of times;
   (G) define a topological order vector, wherein the topological order vector includes an indicator for each variable of the plurality of variables in an order defined such that each variable's parent set is a subset of variables listed in the topological order vector whose order is lower;
   (H) compute a topological order loss value from a subset of the computed equation loss values stored in (D) based on the defined topological order vector;
   (I) repeat (G) through (H) for each unique permutation of the topological order vector defined in (G);
   (J) determine a best topological order vector based on a comparison between the topological order loss value computed for each topological order vector in (H); and
   (K) output the determined best topological order vector to describe a hierarchical relationship between the plurality of variables.

2. The non-transitory computer-readable medium of claim 1, wherein the loss value is a mean squared error value.

3. The non-transitory computer-readable medium of claim 1, wherein the indicator for each variable of the plurality of variables is a unique index assigned to each variable of the plurality of variables.

4. The non-transitory computer-readable medium of claim 1, wherein the second plurality of observation vectors is identical to the plurality of observation vectors.

5. The non-transitory computer-readable medium of claim 1, wherein the second plurality of observation vectors is different than the plurality of observation vectors.

6. The non-transitory computer-readable medium of claim 1, wherein before (D), the computer-readable instructions further cause the computing device to (AA) repeat (B) and (C) a predefined number of times to compute the loss value, wherein a different plurality of observation vectors is used each repetition of (C) in (AA).

7. The non-transitory computer-readable medium of claim 6, wherein the loss value is a sum of the loss values computed from each iteration of (C) in (AA).

8. The non-transitory computer-readable medium of claim 1, wherein the best topological order vector is determined in (J) as the topological order vector defined in (G) that resulted in a minimum value of the topological order loss value computed for each topological order vector in (H).

9. The non-transitory computer-readable medium of claim 1, wherein the topological order vector is defined in (G) as a unique permutation of the indicator for each variable of the plurality of variables.

10. The non-transitory computer-readable medium of claim 1, wherein the plurality of times equals $N_v * 2^{N_v-1}$, where $N_v$ indicates a number of the plurality of variables.

11. The non-transitory computer-readable medium of claim 1, wherein the computed equation loss value is stored in an array having a dimension of $N_v * 2^{N_v-1}$, where $N_v$ indicates a number of the plurality of variables, wherein the computed equation loss value is stored in the array using the identifier as an index into the array.

12. The non-transitory computer-readable medium of claim 1, wherein a number of unique permutations of the topological order vector defined in (G) is equal to $N_v!$, where $N_v$ indicates a number of the plurality of variables, and ! indicates a factorial computation.

13. The non-transitory computer-readable medium of claim 1, wherein computing the topological order loss value from the subset of the computed equation loss values stored in (D) based on the defined topological order vector comprises:
(AA) initializing the topological order loss value to zero;
(AB) initializing a target variable index;
(AC) retrieving the stored, computed equation loss value based on an index associated with the defined topological order vector and the target variable index;
(AD) adding the retrieved equation loss value to the topological order loss value; and
(AE) repeating (AC) and (AD) while the target variable index is less than a number of the plurality of variables.

14. The non-transitory computer-readable medium of claim 13, wherein the computed equation loss value is stored in an array having a dimension of $N_v * 2^{N_v-1}$, where $N_v$ indicates a number of the plurality of variables, wherein the computed equation loss value is stored in the array using the identifier as an index into the array.

15. The non-transitory computer-readable medium of claim 14, wherein retrieving the stored, computed equation loss value based on the index comprises:
sorting the zero or more input variables of the defined topological order vector in ascending order to define a sorted topological order vector;
mapping the sorted topological order vector to the identifier using the target variable index; and
retrieving the equation loss value from the array.

16. The non-transitory computer-readable medium of claim 1, wherein, in (A), the target variable and the zero or more input variables are defined by determining an equation vector using the identifier.

17. The non-transitory computer-readable medium of claim 16, wherein the equation vector has a dimension of $N_v$, where $N_v$ indicates a number of the plurality of variables, wherein each entry of the determined equation vector has either a zero value or a non-zero value.

18. The non-transitory computer-readable medium of claim 17, wherein, in (A), the target variable and the zero or more input variables are defined by entries in the determined equation vector having non-zero values, wherein, when only one entry of the equation vector has a non-zero value, a position of the non-zero value in the determined equation vector indicates an index of the target variable in the plurality of variables, and there are no input variables.

19. The non-transitory computer-readable medium of claim 18, wherein, when a plurality of entries of the equation vector has the non-zero value, a last entry of the equation vector having the non-zero value indicates the index of the target variable in the plurality of variables and reLening non-zero values indicate an input variable index of an input variable in the plurality of variables.

20. The non-transitory computer-readable medium of claim 1, wherein the determined best topological order vector is used to determine each variable's parent set to define a directed acyclic graph.

21. The non-transitory computer-readable medium of claim 1, wherein, after (J), the computer-readable instructions further cause the computing device to:
(L) define a second target variable and a second, zero or more input variables based on a first index and a second index;
(M) train a second machine learning model with the plurality of observation vectors using the defined second target variable and the defined second, zero or more input variables;
(N) execute the trained second machine learning model using the second plurality of observation vectors with the defined second target variable and the defined second, zero or more input variables to compute a residual vector;
(O) repeat (M) through (N) a first plurality of times after incrementing the second index;
(P) repeat (L) through (O) a second plurality of times after incrementing the first index;
(Q) determine a parent set for each variable of the plurality of variables based on a comparison between the residual vector computed in (N); and
(R) output the determined parent set for each variable of the plurality of variables to describe a directed acyclic graph that further defines the hierarchical relationship between the plurality of variables.

22. The non-transitory computer-readable medium of claim 21, wherein, after (J) and before (L), the computer-readable instructions further cause the computing device to:
(AA) define an initial second target variable and an initial second, zero or more input variables based on the first index;
(AB) train the second machine learning model with the plurality of observation vectors using the defined initial second target variable and the defined initial second, zero or more input variables; and
(AC) execute the second machine learning model trained in (AB) using the second plurality of observation vectors with the defined initial second target variable and the defined initial second, zero or more input variables to compute an initial residual vector.

23. The non-transitory computer-readable medium of claim 22, wherein, after (O) and before (P), the computer-readable instructions further cause the computing device to:
determine if the residual vector computed in (N) is dependent on the initial residual vector computed in (AC) using an independence test method; and when the residual vector computed in (N) is dependent on the initial residual vector computed in (AC), store an indicator that the variable indicated by an $i^{th}$ variable is a parent variable of a $j^{th}$ variable, where i indicates the first index and j indicates the second index.

24. The non-transitory computer-readable medium of claim 21, wherein the first plurality of times is equal to a number of the plurality of variables, and the second plurality of times is equal to the number of the plurality of variables minus one.

25. The non-transitory computer-readable medium of claim 1, wherein, after (J), the computer-readable instructions further cause the computing device to:
(L) define a second target variable based on a first index;
(M) define a second, zero or more input variables based on a second index;
(N) train a second machine learning model with the plurality of observation vectors using the defined second target variable and the defined second, zero or more input variables;
(O) execute the trained second machine learning model using the second plurality of observation vectors with the defined second target variable and the defined second, zero or more input variables to compute a second loss value;
(P) repeat (M) through (O) a first plurality of times after incrementing the second index;
(Q) identify a third loss value computed in (O) that results when all of the plurality of variables except the defined second target variable are selected as the defined second, zero or more input variables;
(R) identify a fourth loss value computed in (O) that is less than the identified third loss value plus a predefined selection threshold value;
(S) identify the defined second, zero or more input variables associated with the computation of the fourth loss value in (O);
(T) select the identified second, zero or more input variables as parent variables for the defined second target variable;
(U) repeat (L) through (T) a second plurality of times after incrementing the first index; and
(V) output the determined parent variables for each variable of the plurality of variables to describe a directed acyclic graph that further defines the hierarchical relationship between the plurality of variables.

26. The non-transitory computer-readable medium of claim 25, wherein the first plurality of times is equal to $2^{(i-1)}$, where i indicates the first index.

27. The non-transitory computer-readable medium of claim 25, wherein the second plurality of times is equal to $N_v-1$, where $N_v$ indicates a number of the plurality of variables.

28. The non-transitory computer-readable medium of claim 25, wherein, in (R), a plurality of fourth loss values is identified, wherein the fourth loss value is one of the plurality of fourth loss values, wherein, in (S), the defined second, zero or more input variables associated with each fourth loss value of the plurality of fourth loss values is identified, and after (S) and before (T), the computer-readable instructions further cause the computing device to:
determine a number of the defined second, zero or more input variables associated with the computation of each fourth loss value of the plurality of fourth loss values; and
select a minimum number of variables value from the determined number of the defined second, zero or more input variables associated with the computation of each fourth loss value of the plurality of fourth loss values,
wherein, in (T), the identified second, zero or more input variables selected as parent variables for the defined second target variable is the defined second, zero or more input variables associated with the selected minimum number of variables value.

29. A computing device comprising:
a processor; and
a non-transitory computer-readable medium operably coupled to the processor, the computer-readable medium having computer-readable instructions stored thereon that, when executed by the processor, cause the computing device to
(A) define a target variable and zero or more input variables from a plurality of variables based on an identifier;
(B) train a machine learning model with a plurality of observation vectors using the defined target variable and the zero or more input variables, wherein each observation vector of the plurality of observation vectors includes a variable value for each variable of the plurality of variables;
(C) execute the trained machine learning model with a second plurality of observation vectors using the defined target variable and the zero or more input variables to compute an equation loss value, wherein each observation vector of the second plurality of observation vectors includes the variable value for each variable of the plurality of variables;
(D) store the computed equation loss value in association with the identifier;
(E) increment the identifier;
(F) repeat (B) through (E) a plurality of times;
(G) define a topological order vector, wherein the topological order vector includes an indicator for each variable of the plurality of variables in an order defined such that each variable's parent set is a subset of variables listed in the topological order vector whose order is lower;
(H) compute a topological order loss value from a subset of the computed equation loss values stored in (D) based on the defined topological order vector;
(I) repeat (G) through (H) for each unique permutation of the topological order vector defined in (G);
(J) determine a best topological order vector based on a comparison between the topological order loss value computed for each topological order vector in (H); and
(K) output the determined best topological order vector to describe a hierarchical relationship between the plurality of variables.

30. A method of learning a topological order of a plurality of variables, the method comprising:
(A) defining, by a computing device, a target variable and zero or more input variables from a plurality of variables based on an identifier;
(B) training, by the computing device, a machine learning model with a plurality of observation vectors using the defined target variable and the zero or more input variables, wherein each observation vector of the plurality of observation vectors includes a variable value for each variable of the plurality of variables;
(C) executing, by the computing device, the trained machine learning model with a second plurality of observation vectors using the defined target variable and the zero or more input variables to compute an equation loss value, wherein each observation vector of the second plurality of observation vectors includes the variable value for each variable of the plurality of variables;

(D) storing, by the computing device, the computed equation loss value in association with the identifier;

(E) incrementing, by the computing device, the identifier;

(F) repeating, by the computing device, (B) through (E) a plurality of times;

(G) defining, by the computing device, a topological order vector, wherein the topological order vector includes an indicator for each variable of the plurality of variables in an order defined such that each variable's parent set is a subset of variables listed in the topological order vector whose order is lower;

(H) computing, by the computing device, a topological order loss value from a subset of the computed equation loss values stored in (D) based on the defined topological order vector;

(I) repeating, by the computing device, (G) through (H) for each unique permutation of the topological order vector defined in (G);

(J) determining, by the computing device, a best topological order vector based on a comparison between the topological order loss value computed for each topological order vector in (H); and (K) outputting, by the computing device, the determined best topological order vector to describe a hierarchical relationship between the plurality of variables.

* * * * *

UNITED STATES PATENT AND TRADEMARK OFFICE
CERTIFICATE OF CORRECTION

PATENT NO. : 12,056,207 B1
APPLICATION NO. : 18/538070
DATED : August 6, 2024
INVENTOR(S) : Xilong Chen et al.

It is certified that error appears in the above-identified patent and that said Letters Patent is hereby corrected as shown below:

In the Specification

Column 24, Line 24:
Delete the phrase "threshold value e may" and replace with --threshold value $\epsilon$ may--.

Column 25, Lines 54-55:
Delete the phrase "$L_{e,i,j} <\in +L_{e,i,2^{(i-1)}-1}$" and replace with --$L_{e,i,j} < \epsilon + L_{e,i,2^{(i-1)}-1}$--.

Column 28, Line 36:
Delete the phrase "indicated by xx, and" and replace with --indicated by $x_j$, and--.

Signed and Sealed this
Twenty-sixth Day of November, 2024

Katherine Kelly Vidal
*Director of the United States Patent and Trademark Office*